United States Patent
Altheimer et al.

(10) Patent No.: US 8,840,245 B2
(45) Date of Patent: Sep. 23, 2014

(54) FLEXIBLE PROGRESSIVE LENS OPTIMIZER

(75) Inventors: Helmut Altheimer, Baiswell-Lauchdorf (DE); Wolfgang Becken, München (DE); Gregor Esser, München (DE); Dietmar Uttenweiler, Icking (DE)

(73) Assignee: Rodenstock GmbH, Munich (DE)

( * ) Notice: Subject to any disclaimer, the term of this patent is extended or adjusted under 35 U.S.C. 154(b) by 779 days.

(21) Appl. No.: 12/524,293

(22) PCT Filed: Jan. 25, 2008

(86) PCT No.: PCT/EP2008/000585
§ 371 (c)(1),
(2), (4) Date: Aug. 11, 2010

(87) PCT Pub. No.: WO2008/089996
PCT Pub. Date: Jul. 31, 2008

(65) Prior Publication Data
US 2010/0309428 A1    Dec. 9, 2010

(30) Foreign Application Priority Data
Jan. 25, 2007 (DE) .......................... 10 2007 003 849

(51) Int. Cl.
*G02C 7/06* (2006.01)
*G02C 7/02* (2006.01)

(52) U.S. Cl.
CPC ................ *G02C 7/028* (2013.01); *G02C 7/025* (2013.01); *G02C 7/027* (2013.01); *G02C 7/061* (2013.01); *G02C 7/063* (2013.01)
USPC ................................ 351/159.76; 351/159.42

(58) Field of Classification Search
CPC ........ G02C 7/028; G02C 7/025; G02C 7/027; G02C 7/061; G02C 7/063
USPC ........................................ 351/159.73–159.77
See application file for complete search history.

(56) References Cited

U.S. PATENT DOCUMENTS

| 5,444,503 A | 8/1995 | Kelch et al. |
| 5,880,810 A * | 3/1999 | Altheimer et al. ....... 351/159.42 |

(Continued)

FOREIGN PATENT DOCUMENTS

| DE | 197 01 312 A1 | 7/1998 |
| WO | WO 2004/086125 A1 | 10/2004 |

OTHER PUBLICATIONS

Oranna Guth, DIPL-.ING, "Gradal Individual *FrameFit*—die neue Gestaltungsfreiheit bei Gleitsichtglaesern", XP-000962819, Jun. 2006, pp. 76-80.

(Continued)

*Primary Examiner* — Zachary Wilkes
(74) *Attorney, Agent, or Firm* — Crowell & Moring LLP

(57) ABSTRACT

An individual spectacle lens design for a progressive spectacle lens exhibiting an individual vertical position of the distance and/or the near reference points, which can be variably adjusted, is calculated. A starting design exhibiting a predefined vertical position of the distance and/or the near reference points is determined; the individual spectacle lens design is calculated having the desired, individual vertical position of the distance and/or near reference points. The calculation of the individual spectacle lens design includes calculating the target value for the spatial distribution of at least one optical property of the individual spectacle lens by a mapping and a transform, where the starting design has a corresponding target value.

23 Claims, 23 Drawing Sheets

(56) References Cited

U.S. PATENT DOCUMENTS

| | | | |
|---|---|---|---|
| 6,089,713 | A | 7/2000 | Hof et al. |
| 6,789,898 | B2 * | 9/2004 | Le Saux et al. ........... 351/159.01 |
| 7,229,173 | B2 * | 6/2007 | Menezes .................. 351/159.42 |
| 2005/0270482 | A1 * | 12/2005 | Fisher et al. .................. 351/177 |
| 2007/0132945 | A1 | 6/2007 | Haser et al. |

OTHER PUBLICATIONS

"ImpressionIST—Das 4-in-1 Integrierte Service-Terminal von Rodenstock", XP-000962763, Jan. 2006, pp. 56-61.

DIPL.-ING. (FH) Gregor Esser , "Die Performance individueller Gleitsichtglaeser", XP-000962762, Dec. 2005, pp. 38-44.

DIPL.-ING. (FH) Stefanie Schuldt, "ysis-Natuerliches Sehen erleben", XP-002398937, May 2004, pp. 38-43.

International Search Report dated May 29, 2008 with an English translation (Seven (7) pages).

Forms PCT/ISA/220 and PCT/ISA/237 dated May 29, 2008 (Eight (8) pages).

Japanese Decision of Rejection dated Jul. 2, 2013, with English translation (Ten (10) pages).

* cited by examiner

FIG 6

Ordered data: Prescription and centration

Spectacle lens: Target values | Eye: Refraction

| Dioptric power | Prescription | | Target values lens | ☑ Adjust accommodation |
|---|---|---|---|---|
| Reference distance A1 | 0.00 | | 0.00 | |
| Reference near A1 | -2.00 | ☐ n. Norm | -3.00 | ☐ A1 lens as prescription |

$D = A' - A - Akk$     $A' = A + D + Akk$

| | | | | |
|---|---|---|---|---|
| Sphere | 2.00 | D | 2.000 | Position of wear ▼ |
| Cylinder | 0.00 | D | 0.000 | Position of wear ▼ |
| Axis | 0.00 | degree | 0.000 | Position of wear ▼ |
| Addition | 2.00 | D | 3.000 | Position of wear ▼ |
| Prism horizontal | 0.00 | cm/m | 0.000 | Position of wear ▼ |
| Prism vertical | 0.00 | cm/m | 0.000 | Position of wear ▼ |
| Prism Base | 0.00 | cm/m | | All p.o.w. | All SMScv |
| | 45.00 | degreeTabo | | |

[CVD transposition]   ☑ Eye values = prescription values spectacles p.o.w. and centration

| | | |
|---|---|---|
| Pupillary distance | 63.0 | mm |
| Corneal vertex distance | 15.0 | mm |
| Forward inclination | 8.0 | degree |
| Ocular center of rotation distance | 28.5 | mm |

Angle between zero direction of sight and z axis   0.00 degree

Ocular center of rotation:              Decentration
x-coordinate    -0.00    mm           x-coordinate  0.00 mm
y-coordinate    -0.50    mm           y-coordinate  0.00 mm
z-coordinate    32.12    mm           z-coordinate  0.00 mm

[OK]   [Cancel]   [Help]

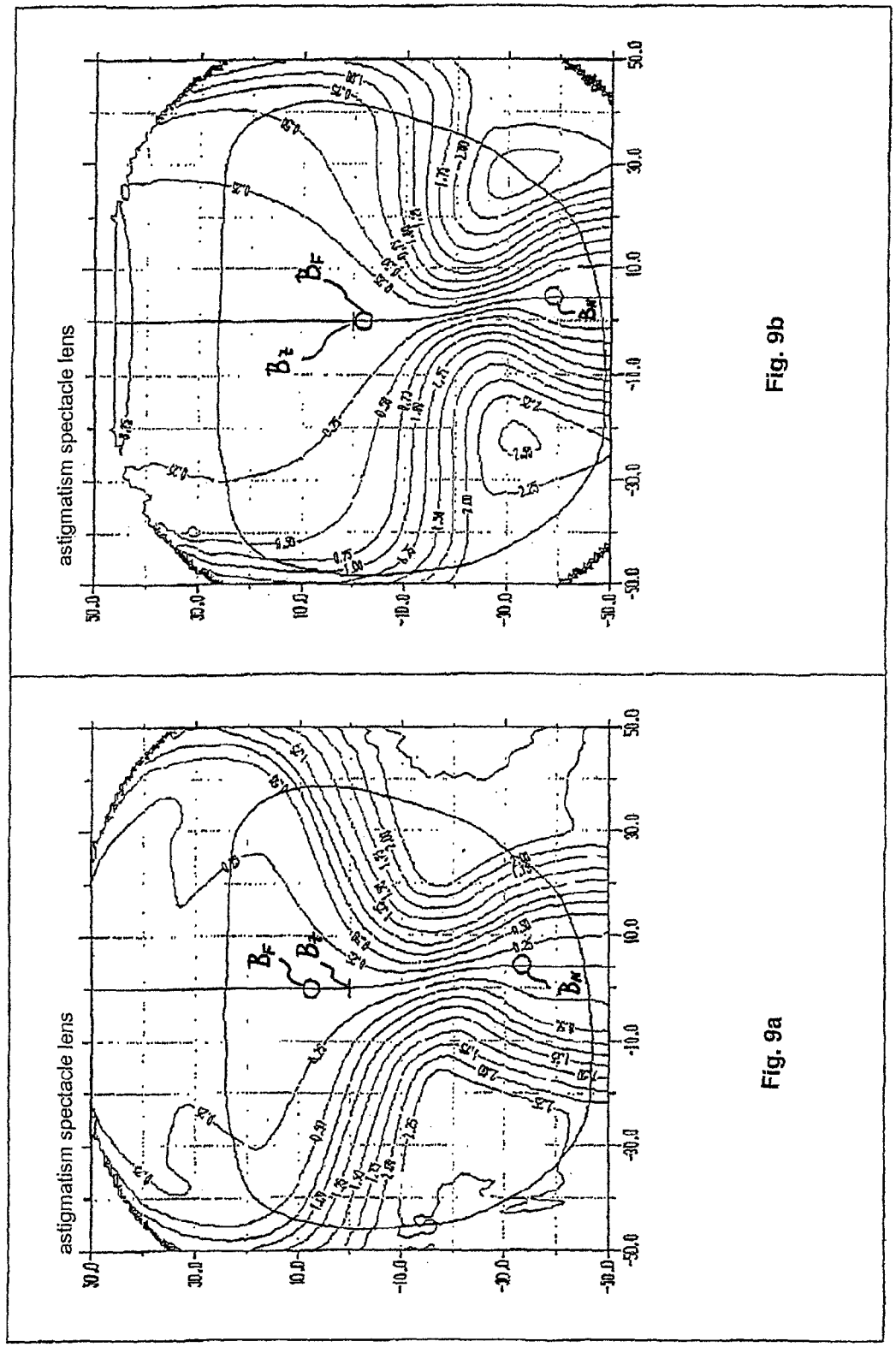

Fig. 13
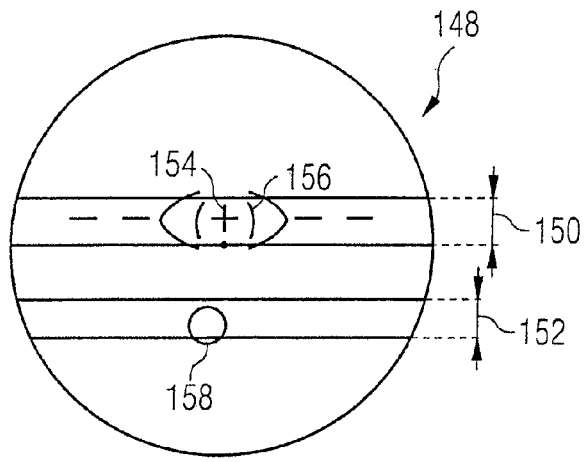
Fig. 14
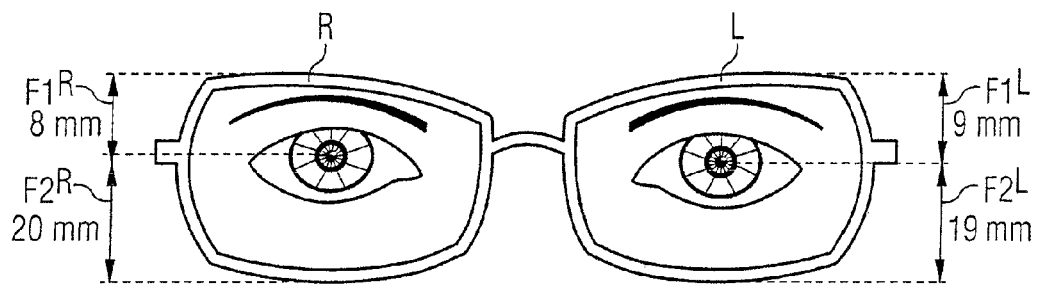
Fig. 15a  Fig. 15b
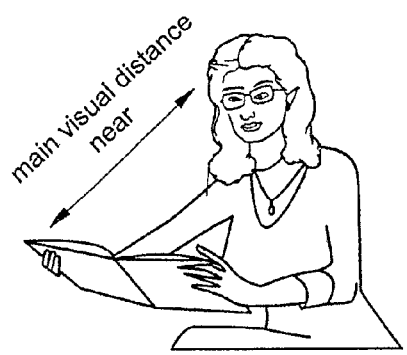

FIG 18

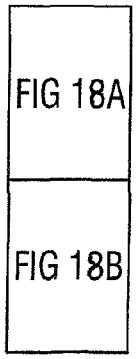

FIG 18A

Rodenstock spectacle lenses    ○ Order    ○ Request  ○ Repetition

Order basic data

Customer no.: _____   Comission: _____

Date: _____   Delivery: _____

Lens type / EDP code: _____ R⌀__ /__○ centr.

Color / Coating: _____ L⌀__ /__○ centr.

|   | Sph. | Cyl. | Axis | Add | Prism 1 | Base 1 | Prism 2 | Base 2 |
|---|---|---|---|---|---|---|---|---|
| R |  |  |  |  |  |  |  |  |
| L |  |  |  |  |  |  |  |  |

Adjustment of prismatic vertical differences in case of anisometropy  ○ yes  ○ no Company Allocate prisms?
R/L
○ yes
○ no

Frame and centration data

| Frame [Box dimension in mm] | | | Centration fitting data in mm | | | Centration correction taken into account  ○ yes  ○ no |
|---|---|---|---|---|---|---|
| HLS | VLS | AzG | Horizontal | $P_R$ | $P_L$ | |
| | | | Vertical | $Y_R$ | $Y_L$ | |

R        L

Draw in drill holes and nicks

○ MDM  ○ Optimized diameter | Min. edge thickness of the edged lens [mm] | Thickness at marked point [mm]

FIG 18B

| | Pupillary distance (PD) [mm] | R | L |
|---|---|---|---|
| Optimization parameters | CVD of the correction spectacles [mm] | R | L |
| | CVD of the measurement spectacles [mm] | R | L |
| | Frame forward inclination [°] | R | L |
| | Face form angle [°] | R | L |
| | Inset [°] | R | L |
| | ○ Standard Design    ○ Frame - optimized design    ○ Individual design | | |
| |      ○ DN=−18 mm      please indicate frame and      Design point distance: (DD):___ | | |
| |      ○ DN=−16 mm      centration data      Design point near: (DN):___ | | |
| |      ○ DN=−14 mm | | |
| | ○ Individual near distance | | |
| |      Refraction distance NEAR ___ cm      ○ Base curve ___ D | | |
| |      Principal viewing distance NEAR ___ cm | | |

| | For prisms in position of wear | | | | | | | | | | |
|---|---|---|---|---|---|---|---|---|---|---|---|
| Prisms | Arrangement of the refraction lenses in the measurement spectacles (perpendicular in front of the eye) | | | | | | | | | | |
| | | Sph. | Cyl. | Prism | Base | Slant | Eye | Sph. | Cyl. | Prism | Base | Slant |
| | 5 | | | | | | | | | | | |
| | 4 | | | | | | Frame | | | | | |
| | 1 | | | | | | Plane | | | | | |
| | 2 | | | | | | | | | | | |
| | 3 | | | | | | Object | | | | | |
| | Centration of the refraction lenses in the measurement spectacles | | | | | | | | | | |
| | ○ PMZ    ○ Formula centration    ○ Special case    Horizontal [mm] R    L    Vertical [mm] R    L | | | | | | | | | | |
| | Position of the facette | | | | | | | | | | |
| | Expected facette course of the edged lens    R ○ Object-side ○ 1/2 Eye-side ○ 1/3 Eye-side    L ○ Object-side ○ 1/2 Eye-side ○ 1/3 Eye-side | | | | | | | | | | |

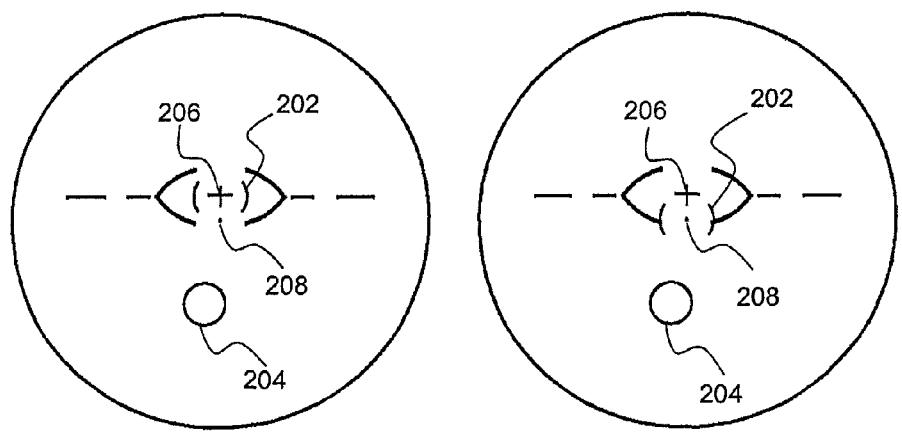
Fig. 21, Abb. A     Fig. 21, Abb. b
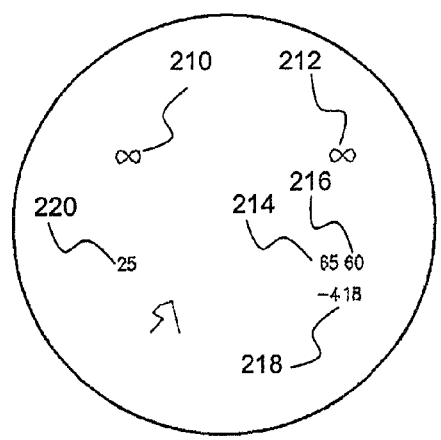
Fig. 22

Fig. 23

Impression FreeSign Perfalit 1.6

Solitaire                                    ⌀56/62

R gradually gray  10/75%              MDM

|   |   ⊕   |   ⌭   |   ⌒   |   ◢   |   ⊕   |   ✚   |
|---|------|------|------|------|------|------|
| 📝 | 2,00 | 1,00 | 35   | 4,00 | 45   | 2,00 |
| ≡⌇ | 1,65 | 1,25 | 38   | 3,70 | 36   | 1,78 |

COR👁 31,7

👁 32,0    ⊾ 9,0°    DF 1,2    INS 0,5    BC 6,5

⌐ 13,0    △ 15,0°   DN-15,6   👁 0,0  | 👁 0,0 PMZ

Fig. 24

| prescription values | | | |
|---|---|---|---|
| | right | | prism |
| | left | | base |
| | sphere | | sphere |
| | cylinder | | prescription value |
| | axis | | target value |
| | diameter | | center thickness minimization |
| individual parameters | | design parameters | |
| | corneal vertex distance | DF | design point distance |
| | face form angle | DN | design point near |
| | forward inclination | BC | base curve |
| | pupillary distance right | INS | inset |
| | pupillary distance left | | |
| centration | | | |
| COR | corrected fitting PD right | COR | corrected fitting PD left |
| | centration correction right nasal | | centration correction left nasal |
| | centration correction right temporal | | centration correction left temporal |
| | centration correction right bottom | | centration correction left bottom |
| | centration correction right top | | centration correction left top |
| PMZ | pupil center centration | FF | formula centration |
| additional information | | | |
| CVD Refraktion | Corneal vertex distance refraction | HDEC | horizontal predecentration |
| Prism Adaption | prism adaption | MVDN | main visual distance near |
| RDN | refraction distance near | | |

FLEXIBLE PROGRESSIVE LENS OPTIMIZER

The invention relates to a method for calculating an individual spectacle lens design, a method for producing an individual progressive spectacle lens, and a corresponding apparatus for producing an individual progressive spectacle lens, a computer program product, a storage medium, and a use of a spectacle lens.

Calculation or optimization of progressive spectacle lenses in the respective position of wear and situation of wear have achieved a high technical and optical standard since. For example, according to the prior art, progressive spectacle lenses can be optimized and calculated as one-of-a-kind online after receipt of order, taking into account the individual prescription (sph, cyl, axis, add, prism, base) and the individual positions or arrangements of the lenses in front of the spectacle wearer's eye (e.g. corneal vertex distance (CVD), face form angle (FFA), forward inclination or pantoscopic angle), as well as physiological parameters (e.g. pupillary distance). However, the positioning of the spectacle lens with respect to the customer's eye, i.e. in the spectacle frame, is fixedly specified (e.g. by reference point requirement) by the manufacturer and cannot be varied. Furthermore, a customer may only choose from few (usually 2) spectacle lens designs which then only differ by the progression length. A fitting of the viewing zones to special customer needs regarding individual principal directions of sight and application priorities, coupled with a specific possibly limiting choice of frames, has not been possible so far.

Moreover, according to the prior art, individual target values (designs) are created and deposited for each design to be newly developed and also particularly for each progression zone length. For example, in addition to the universal progressive lenses, designs are also developed for various special progressive lenses, which often only differ with respect to the main viewing functions and thus with respect to the principal directions of sight in the near and distance zones. Therefore, PCT/DE01/00188 suggests specifying the design for different applications (driver, pilot, watchmaker, . . . ) right away. Despite this very complex procedure concerning design creation and also concerning the logistics of the many different designs with the manufacturer and also the necessary product training courses with the optician, it is often not possible to satisfactorily react to individual situation of wears with these standard designs, since in all these variants the reference points and principal viewing zones cannot be changed at a later time.

It is the object of the invention to provide a fast and efficient method for calculating an individual spectacle lens design as well as a method for producing a spectacle lens based on the individual, calculated spectacle lens design. Moreover, it is an object of the invention to provide a corresponding apparatus for producing an individual spectacle lens as well as a corresponding computer program product and a storage medium.

This object is solved by a method for calculating an individual spectacle lens design including the features of claim 1, a method for calculating an individual spectacle lens design including the features of claim 28, a method for producing an individual progressive spectacle lens including the features of claim 31, an apparatus for producing an individual spectacle lens including the features of claim 32, a computer program product including the features of claim 33, a storage medium including the features of claim 34, and a use of a spectacle lens including the features of claim 35. Preferred embodiments are subject of the dependent claims.

According to the invention, a computer-implemented method for calculating an individual spectacle lens design for a progressive spectacle lens having a variably adjustable, individual vertical position of the distance and/or the near reference point is provided, the method comprising the following steps:

specifying a starting design exhibiting a predetermined vertical position of the distance and/or the near reference point;

calculating the individual spectacle lens design such that it exhibits the required, individual vertical position of the distance and/or the near reference point, wherein the calculation of the individual spectacle lens design comprises a calculation of a target value $S_{target}(v)$ for the spatial distribution of at least one optical property of the individual spectacle lens by means of a mapping $S_{target}(y) = S'_{target}(y')$ and a transform Y: $y \mapsto y', y \mapsto y'(y) = y - \Delta y(y)$ of a corresponding target value $S'_{target}(y')$ of the starting design, wherein y' is the vertical coordinate of the target value of the starting design and y is the vertical coordinate of the transformed target value of the individual spectacle lens design.

The vertical direction preferably relates to the vertical direction in the position of wear of the spectacle lens, wherein the spectacle lens is e.g. located in an average (e.g. as defined in DIN 58 208 part 2) or in an individual position of wear. Preferably, the spectacle lens is located in an individual position of wear.

The coordinate system is preferably a coordinate system in the object-side surface of the spectacle lens, wherein the origin of the coordinate system e.g. coincides with the geometric center of the (raw round) spectacle lens or with the centration or fitting point of the spectacle lens. The vertical and horizontal axes lie in the tangential plane with respect to the object-side surface in the geometric center or the centration or fitting point. It is of course possible to define the transform in other suitable coordinate systems.

The design of a spectacle lens comprises the distribution of the target values for one or more optical properties or aberrations which are considered as target values in the optimization of the spectacle lens, and optionally a suitable object model. The object model may e.g. comprise an object distance function defined as the reciprocal object distance along the principal line of the spectacle lens. An example of a suitable object model is defined in DIN 58 208 part 2 (cf. image 6). Likewise, a standardized position of wear is defined in DIN 58 208 part 2.

In order to produce progressive lenses with different designs (i.e. with different target values for the aberrations, in particular for the astigmatic deviation), the corresponding different designs and target values have to be created and optimization has to be performed therewith.

A spectacle lens design is in particular characterized by the distribution of the refractive error (i.e. the difference of the refractive power of the spectacle lens and the refractive power determined by means of refraction) and/or the distribution of the astigmatic error or astigmatic deviation (i.e. the difference of the astigmatism of the spectacle lens and the astigmatism determined by means of refraction). Furthermore, a spectacle lens design may also comprise the distribution of the target values for magnification errors, distortion errors or other aberrations. These values may be surface values or preferably powers of wear, i.e. powers in the position of wear of the spectacle lens. The calculation of an individual spectacle lens design in this sense comprises the calculation of the target values for the individual optical properties and aberrations (e.g. refraction errors, astigmatic deviation, magnification, distortion, etc.), which are to be attributed to the individual spectacle lens design.

A progressive spectacle lens design usually comprises a distance, a near and an intermediate or progression zone. The 0.5-D astigmatism line is usually used for delimiting the individual viewing zones against the periphery. However, it is possible to use other isoastigmatism lines, such as the 0.75 or 1.0-D isoastigmatism lines, for delimiting the viewing zones.

A design comprises a predetermined spatial location of the distance and/or the near reference point if the values for the powers of the distance and/or near portion(s) (which are determined e.g. by means of refraction) prescribed and required for the spectacle wearer are achieved in the respective reference point. Put differently, the target values for the aberrations (in particular astigmatic deviation and refractive error) associated with the design are to be as small as possible (preferably substantially zero) in the distance and/or the near reference point.

According to the invention, the new target values or the target values of the individual spectacle lens design may be transformed from already existing older target values or target values of the starting design, i.e. the new target values at y result from the old target values at y', where y'=y−Δy(y).

The transform of the target values merely takes place in the vertical direction (y direction). No transform of the target values of the starting design takes place in the horizontal direction. As such, the expression $S_{target}(y)$ is understood to be short for $S_{target}(x,y)$ and the expression $S'_{target}(y')$ short for $S_{target}(x,y')$. Alternatively, the target values may be provided in the coordinate system $\{u, y\}$ instead of the coordinate system $\{x, y\}$, where u is the horizontal distance from a predetermined principal line. In this coordinate system, the expression $S_{target}(y)$ corresponds to the expression $S_{target}(u, y)$ and the expression $S'_{target}(y')$ corresponds to the expression $S'_{target}(u,y')$.

Accordingly, the starting design preferably includes values for the course of a principal line and the calculation of the individual spectacle lens design a transform of the principal line. The x coordinate of the transformed principal line is calculated from the predetermined principal line of the starting design e.g. as follows:

$$x_0(y)=x_0(y'),$$

where $$y'=y-\Delta(y),$$

$x_0(y')$ is the x coordinate of the predetermined principal line of the starting design for the y value y'; and
$x_0(y)$ is the x coordinate of the transformed principal line for the y value y.

Thus, by means of the inventive method, a progressive lens with an arbitrary vertical positions of the reference points for near and distance (near and distance reference points) and principal viewing zones can be directly derived and optimized from an existing progressive lens design (starting design) thus maintaining the design characteristic. To this end, it is sufficient to merely specify the desired individual position of the distance reference point $B_F$ and/or the near reference point $B_N$ (in the following also referred to as reference points for distance $B_F$ and near $B_N$). The vertical position and the length of the progression zone of the progressive surface are automatically matched to the individual situation of wear. In doing so, an arbitrary positions of the reference points for distance $B_F$ and near $B_N$ may be taken into account for optimizing the spectacle lens.

Consequently, an essential advantage of the invention is that the above-described additional effort for creating suitable target values, in particular for individual progressive spectacle lenses, is avoided. Furthermore, with the inventive method, it is possible to create variants and designs of longer and shorter progression from only one predetermined starting design by means of a relatively easy and fast-to-perform calculation. In addition, the viewing zones may be arbitrarily positioned in a vertical direction without the design characteristic and the good imaging properties of the start or basic design getting lost.

According to a preferred embodiment, it holds true for the transform Y: $\Delta y(y)=y_0$, where $y_0$ is a constant.

If e.g. only the principal direction of sight of a spectacle wearer deviates from the distance reference point of the spectacles in the vertical direction in the distance, then the spectacle lens design may better suit the spectacle wearer's need if the vertical positioning of the target values is variable, i.e. $\Delta y(y)=y_0$, where $y_0$ is a constant. A positive value of $y_0$ means that the new target values appear to be shifted upward compared to the old reference values.

According to a further preferred embodiment, it holds true for the transform Y:

$$\Delta y(y)=\alpha y+y_0$$

where:
α is a constant; and
for α>0, the transform causes a stretching of the starting design;
for α<0, the transform causes a compression, or squeezing, of the starting design.

As described above, the spectacle lens design may better suit the spectacle wearer's need if apart from the vertical positioning also the target values can be stretched or compressed, i.e. $\Delta y(y)=\alpha y+y_0$. Here, α is a constant that is positive if the design is stretched, and negative if it is compressed.

Preferably, it holds true for the transform Y:

$$\Delta y(y)=f(y)+y_0,$$

where:
for $f'(y)>0$, the transform causes a local stretching, and
for $f'(y)<0$, the transform causes a local compression of the starting design.

If stretching or compression and the shift are controlled by the affine function $\Delta y(y)=\alpha y+y_0$, then all fields in the distance and near portions as well as in the progression zone are equally affected by the change. However, it is often preferred to obtain specific properties of the distance or the near portion and to only vary the position of the progression zone. Preferably, a function $\alpha y(y)$ having specific characteristics is selected then, e.g. is steeper in the progression zone than in the distance or the near portion, generally a function of the form $\alpha y(y)=f(y)+y_0$. A positive value of the derivative $f'(y)$ represents a local stretching, a negative value represents a local compression.

Preferably, $f(y)$ is monotonic and also preferably, $|f'(y)|$ is higher in the progression zone than in the distance or the near portion, so that these are affected more strongly by stretching or compression.

Preferably, the transform Y depends on the difference of the vertical position of the distance and/or the near reference point of the individual spectacle lens design and the difference of the vertical position of the distance and/or the near reference point of the starting design.

For the function $f(y)$, there are different possibilities of parametrization.

Examples of Suitable Functions are:
a) double-asymptote with transform coefficients a, b, c, m, d:

$$f(y) = b + \frac{a}{(1+e^{c(y+d)})^m} \quad (1)$$

b) Sigmoid $$f(y) = \frac{a}{1+e^{c(y+d)}} \text{ (special case of double-asymptote)} \quad (2)$$

(special case of double-asymptote) (2)

c) Gaussian cumulative function with transform coefficients a, b, c:

$$f(y) = \frac{a}{2}\left(1 + \text{erf}\left(\frac{y-b}{\sqrt{2}\,c}\right)\right) \quad (3)$$

d) Lorentz cumulative function with transform coefficients a, b, c $$f(y) = \frac{a}{\pi}\left(\arctan\frac{y-b}{c}\right) + \frac{\pi}{2} \quad (4)$$

d) Cumulative SDS function with transform coefficients a, b, c, d:

$$f(y) = \quad (5)$$
$$\frac{a}{2c}\left(2d\ln\left(\exp\left(\frac{2y+c}{2d}\right) + \exp\left(\frac{b}{d}\right)\right) - 2d\ln\left(\exp\left(\frac{y}{d}\right) + \exp\left(\frac{2b+c}{2d}\right)\right) + c\right)$$

e) Logistic dose-response function with transform coefficients a, b, c $$f(y) = a\Big/\left(1 + \left(\frac{y}{b}\right)^c\right) \quad (6)$$

f) Log-normal cumulative function with transform coefficients a, b, c:

$$f(y) = \frac{a}{2}\text{erfc}\left(-\ln\left(\frac{y}{b}\right)\Big/\sqrt{2}\,c\right) \quad (7)$$

The above functions b) to g) are e.g. more closely described in the collection in the User's Manual for "TableCurve2D", Version 4 Documentation, Copyright 1996 AISN Software Inc. Moreover, further suitable functions having the above-described characteristics are described therein.

For example, the parameters of the function $f(y)$ may be selected in a targeted manner such that the function $f(y)$ fulfills specific characteristics. Alternatively, the parameter values may be specified directly.

Preferably, it is requested that the y coordinates $y_F$ and $y_N$ of the new distance and near reference points lie with respect to the old y coordinates $y'_F$ and $y'_N$. This means:

$$\Delta y(y_F) = y_F - y'_F, \Delta y(y_N) = y_N - y'_N \quad (8)$$

or equivalent to:

$$f(y_F) = y_F - y'_F - y_0, f(y_N) = y_N - y'_N - y_0, \quad (9)$$

where:
$y_F$ is the vertical position of the distance reference point of the individual spectacle lens design;
$y_{FD}$ is the vertical position of the distance reference point of the starting design;
$y_N$ is the vertical position of the near reference point of the individual spectacle lens design;
$y_{ND}$ is the vertical position of the near reference point of the starting design.

The transform coefficients of the function $f(y)$ are preferably specified starting from given starting values by means of an iterative method.

Preferably, the transform coefficients of the function $f(y)$ are set depending on
the difference $y_F - y_{FD}$ of the vertical position $y_F$ of the distance reference point of the individual spectacle lens design and the vertical position $y_{FD}$ of the distance reference point of the starting design; and/or
the difference $y_N - y_{ND}$ of the vertical position $y_N$ of the near reference point of the individual spectacle lens design and the position $y_{ND}$ of the near reference point of the starting design.

The transform coefficients of the double-asymptote $$f(y) = b + \frac{a}{(1+e^{c(y+d)})^m}$$

may be calculated as follows:

$$m = 1;\ d = -\frac{y_F + y_N}{2} \quad (10)$$

$$c = \frac{2\ln\left(\frac{\varepsilon}{2+\varepsilon}\right)}{l} \quad (11)$$

$$f_M = 1 + e^{-\frac{cl}{2}};\ f_P = 1 + e^{\frac{cl}{2}} \quad (12)$$

$$a = \frac{l - l_D}{f_P^{-1} - f_M^{-1}} \quad (13)$$

$$b = \frac{f_M(l - l_D)}{f_P - f_M} \quad (14)$$

$$y_0 = y_F - y_{FD} \quad (15)$$

where:
$l_D = y_{FD} - y_{ND}$ is the progression length of the starting design;
$l = y_F - y_N$ is the progression length of the individual spectacle lens design;
$y_F$ is the vertical position of the distance reference point of the individual spectacle lens design;
$y_{FD}$ is the vertical position of the distance reference point of the starting design;
$y_N$ is the vertical position of the near reference point of the individual spectacle lens design;
$y_{ND}$ is the vertical position of the near reference point of the starting design;
$1+\varepsilon$ is the factor that determines to what extent the distance $\alpha$ between the distance and the near portion asymptote of the function $f(y)$ exceeds the change of the progression length, wherein preferably $\varepsilon = 0.01$.

Preferably, at least one optical property of the spectacle lens is the astigmatism or the astigmatic deviation.

The astigmatic deviation is defined as the difference between the astigmatism of the spectacle lens (as a surface value or preferably as a value of wear) and the to-be-corrected astigmatism of the spectacle wearer's eye.

Furthermore, the individual spectacle lens design may comprise an individual object distance function along the principal line of sight of the spectacle lens and the starting design may comprise a start object distance function along the principal line of the spectacle lens. The individual object distance function is preferably obtained by means of a second transform $Y_2$ of the start object distance function. Transform Y and the second transform $Y_2$ may be the same.

However, the transform Y and the second transform $Y_2$ may be different as well. Preferably, the transform coefficients of the second transform $Y_2$ are determined by means of a Newton iteration such that the refractive power of the spectacle lens in the distance and/or the near reference point of the individual spectacle lens design matches the refractive power of the spectacle lens in the distance and/or the near reference point of the starting design.

The object distance function, or reciprocal object distance, $S_1(u_0,y)$ is preferably described by a double-asymptote function:

$$S_1(u_0, y) = b_s + \frac{a_s}{(1 + e^{c_s(y-y_0+d_s)})^{m_s}} \quad (16)$$

with coefficients $a_s$, $b_s$, $c_s$, $d_s$, $m_s$, where for predetermined coefficients $a_s$, $b_s$, $m_s$ the coefficients $c_s$, $d_s$ are determined by means of a Newton iteration.

Furthermore, the individual spectacle lens design may comprise individual target values for the corresponding spatial distributions of a plurality of optical properties of the spectacle lens, wherein preferably all individual target values are calculated by means of the transform Y of the corresponding target values of the starting design.

Further preferably, the target value(s) of the individual spectacle lens design are multiplied or scaled by a scaling factor $l/l_D$, a function $h=h(S'(y'),l_D/l)$ or a function $h=h(l_D/l)$, where $l$ is the progression length of the individual spectacle lens design and $l_D$ is the progression length of the starting design.

Preferably, $h(l_D/l)=a \cdot (l_D/l)+b$, where a,b are constants.

Furthermore, according to the invention, a computer-implemented method for calculating an individual spectacle lens design for a progressive spectacle lens having a variably adjustable, individual vertical position of the distance and/or the near reference point is provided, the method comprising the following steps:

specifying a starting design exhibiting a predetermined vertical position of the distance and/or the reference point(s);

calculating the individual spectacle lens design such that it comprises the required, individual vertical position of the distance and/or the near reference point, wherein the calculation of the individual spectacle lens design comprises a calculation of an individual object distance function $S_1(y)$ along the principal line of the spectacle lens by means of mapping $S_1(y)=S'_1(y')$ and a transform $Y: y \mapsto y', y \mapsto y'(y)=y-\Delta y(y)$ of a corresponding object distance function $S'_1(y')$, wherein y' is the vertical coordinate along the principal line of the spectacle lens and y is the vertical coordinate along the principal line of the spectacle lens of the transformed object distance function of the individual spectacle lens design.

Furthermore, according to the invention, a method for producing an individual progressive spectacle lens having a variably adjustable, individual vertical position of the distance and/or the near reference point is provided, the method comprising the following steps:

calculating an individual spectacle lens design exhibiting the required vertical position of the distance and/or the near reference point, according to a preferred inventive method for calculating an individual spectacle lens design;

calculating or optimizing the spectacle lens according to the individual spectacle lens design.

In order to produce progressive spectacle lenses with different designs (i.e. with different target values for the aberrations, in particular for the astigmatic deviation), the corresponding different design and target values have to be created and optimization has to be performed therewith. A design-based optimization of a progressive spectacle lens may be carried out by minimizing an objective function of the form:

$$F(\vec{x}) = \sum_{i=1}^{m} [g_{i,S}(S_i - S_{i,target})^2 + \ldots] \quad (17)$$

where:

$S_{i,target}$ is the local target value for the spatial distribution of at least one optical property at the $i^{th}$ evaluation point;

$S_i$ is the actual local optical property at the $i^{th}$ evaluation point;

$g_{i,S}$ the local weighing.

Preferably, the optimization of the progressive spectacle lens is carried out by minimizing an objective function of the form:

$$F(\vec{x}) = \sum_{i=1}^{m} [g_{i,\Delta R}(\Delta R_i - \Delta R_{i,target})^2 + g_{i,Ast}(Ast_i - Ast_{i,target})^2 + \ldots]. \quad (18)$$

In the Above Formula $\Delta R_{i,target}$ is the target value of the local refractive error at the $i^{th}$ evaluation point;

$\Delta R_i$ is the actual local refractive error at the $i^{th}$ evaluation point;

$Ast_{i,target}$ is the target value of the local astigmatic deviation or the local astigmatic error at the $i^{th}$ evaluation point;

$Ast_i$ is the actual local astigmatic deviation at the $i^{th}$ evaluation point;

$g_{i,\Delta R}$ is the local weighing of the refractive error at the $i^{th}$ evaluation point;

$g_{i,Ast}$ is the local weighing of the astigmatic deviation at the $i^{th}$ evaluation point.

Preferably, the calculation or optimization of the spectacle lens performed considering individual data of the spectacle wearer.

Furthermore, the producing method comprises:

providing surface data of the calculated and optimized spectacle lens; and fabricating the spectacle lens according to the provided surface data of the spectacle lens.

Fabrication and machining may be carried out by means of CNC machines, by means of casting methods, a combination of the two methods or by means of another suitable method.

Furthermore, according to the invention, an apparatus for producing an individual progressive spectacle lens having a variably adjustable, individual vertical position of the distance and/or the near reference point is provided, comprising:
  design calculating means adapted to perform a preferred inventive method for calculating an individual spectacle lens design;
  optimizing and calculating means adapted to perform a calculation and an optimization of the spectacle lens according to the individual spectacle lens design.
More specifically, the design calculating means comprise:
  starting design specifying means for specifying a starting design exhibiting an (individual) predetermined vertical position of the distance and/or the near reference point;
  calculating or optimizing means for calculating the individual spectacle lens design such that it has the required, individual vertical position of the distance and/or the near reference point, wherein the calculation of the individual spectacle lens design comprises a calculation of a target value $S(y)$ for the spatial distribution of at least one optical property of the individual spectacle lens by means of a mapping $S_{target}(y) = S'_{target}(y')$ and a transform $Y: y \mapsto y', y \mapsto y'(y) = y - \Delta y(y)$ of a corresponding target value $S'_{target}(y')$ of the starting design, wherein $y'$ is the vertical coordinate of the target value of the starting design and $y$ is the vertical coordinate of the transformed target value of the individual spectacle lens design.

Preferably, the starting design specifying means comprise storage means for storing the starting design, as well as means for reading out the stored starting design.

Moreover, the apparatus for producing an individual progressive spectacle lens having a variably adjustable, vertical position of the distance and/or the near reference point preferably comprises machining means for finishing the spectacle lens. The machining means may comprise CNC machines for direct machining of a blank according to the individual optimization values.

Preferably, the apparatus for producing an individual progressive spectacle lens further comprises obtaining means for obtaining individual data of the spectacle wearer, which particularly includes data concerning the refractive power of the spectacle lens individually required for the spectacle wearer.

Preferably, the finished spectacle lens has a simple spherical or rotationally symmetric aspherical surface and a progressive surface optimized individually according to the individual design values calculated according to the invention and individual parameters of the spectacle wearer. Preferably, the spherical or rotationally symmetric aspherical surface is the front surface (i.e. the object-side surface) of the spectacle lens. Of course, it is also possible to dispose the individually optimized surface on the front surface of the spectacle lens. It is also possible for both surfaces of the spectacle lens to be progressive surfaces.

Furthermore, according to the invention, a computer program product and a storage medium with a computer program stored thereon are provided, wherein the computer program is adapted, when loaded and executed on a computer, to perform a method for calculating and optimizing a spectacle lens, wherein the method comprises the following steps:
  calculating an individual spectacle lens design exhibiting the required vertical position of the distance and/or the near reference point, according to a preferred inventive method for calculating an individual spectacle lens design;
  calculating or optimizing the spectacle lens according to the individual spectacle lens design.

Furthermore, a use of a spectacle lens, produced according to a preferred producing method, in a predetermined average or individual position of wear of the spectacle lens in front of a spectacle wearer's eyes for correcting a visual defect is provided.

Particularly, advantages of the inventive methods and apparatuses are that
  the difference $y_{FD}$–$y_{FD}$ and $y_N$–$y_{ND}$ may be an arbitrary one. Accordingly, an arbitrary vertical position can be taken into account;
  the existing optimization values and the existing designs can be arbitrarily stretched and compressed via the variable Y transform and thus be matched to the individual situation of wear;
  no interpolation of target values of different designs (e.g. different starting designs having different progression lengths) is necessary;
  from an existing start or basic design, variants with different (longer or shorter) progression zones and progression lengths can be created in a fast and efficient manner;
  if the object distance surface is automatically matched, it is possible to perform an automatic matching of the target refractive power course.

In the following, preferred embodiments of the invention will be described with reference to the figures, which show:
  FIG. 1 two functions $f(y)$ according to a preferred embodiment, wherein FIG. 1a) represents a compression and FIG. 1b) a stretching;
  FIG. 2 an example of a compression transform;
  FIG. 3 an exemplary course of the principal line of a progressive spectacle lens;
  FIG. 4 an exemplary starting design;
  FIG. 5 an exemplary individual spectacle lens design;
  FIG. 6 an exemplary input or user interface for inputting or specifying desired marginal conditions and/or transforms and/or positions of reference points;
  FIG. 7 a schematic illustration of a progressive spectacle lens in an position of wear;
    7a of a conventional progressive spectacle lens;
    7b of a spectacle lens calculated and optimized according to a preferred method;
  FIG. 8a refractive power isolines of a starting design;
  FIG. 8b refractive power isolines of an individual design derived therefrom;
  FIG. 9a isoastigmatism lines of the basic design shown in FIG. 8a;
  FIG. 9b isoastigmatism lines of the individual design shown in FIG. 8b;
  FIG. 10 an example of a mask or graphical user interface for inputting individual customer parameters;
  FIG. 11 an example of a mask or graphical user interface for inputting data relating to the current spectacles;
  FIG. 12 an example of a mask or graphical user interface for inputting data relating to the individual preferences and prioritization of the viewing zones;
  FIG. 13 a schematic illustration of the positions of the distance and near reference points of an individual spectacle lens design;
  FIG. 14 an example of different visual heights of the two eyes;
  FIG. 15 a schematic illustration of the principal viewing distance near (FIG. 15a) and the refraction distance near (FIG. 15b);
  FIG. 16 an example of a graphical user interface for the representation of results;
  FIG. 17 an example of a graphical user interface for the representation of results and design modification or tuning;
  FIG. 18 an example or an order form;

FIG. 19 a schematic illustration of the physiological and physical model of a spectacle lens in a specified position of wear;

FIGS. 20a,b schematic illustrations of the axis positions in a spectacle lens without taking Listing's rule into account (FIG. 20a) and with Listing's rule considered (FIG. 20b);

FIGS. 21a,b two examples of non-permanent stampings of individually calculated progressive spectacle lenses;

FIG. 22 an example of a permanent engraving of a left, individually optimized, progressive spectacle lens;

FIG. 23 an example of a lens packet for an individually optimized spectacle lens;

FIG. 24 a key to the pictograms used on the lens packet;

FIGS. 25a,b examples of the centration of an individual spectacle lens (FIG. 25a) or a standard spectacle lens (FIG. 25b) in front of the spectacle wearer's eyes;

FIGS. 26a-c a schematic illustration of the measurement of the powers of an individual spectacle lens.

The present invention offers the possibility to specify and provide an individual spectacle lens design, in particular for a progressive spectacle lens, in a technologically simple and thus cost-efficient manner on the one hand, and in a short time on the other hand. In particular, a design for a progressive spectacle lens having a variably adjustable, individual vertical position of a distance and/or a near reference point can be provided. More specifically, from only one predetermined spectacle lens design, variants with longer or shorter progression can be created and these can further be arbitrarily positioned in a vertical direction without the design characteristic and the good imaging properties of the start or basic design getting lost.

After an optimum individual position of the distance and/or the near reference point has been determined, an individual design exhibiting the individually determined distance and near reference points is determined. The position of the individually determined distance and/or the near reference point is taken into account as design parameters in the calculation or optimization of the individual spectacle lens design. In the following, the individually definable distance and near reference points will therefore also be referred to as design point "distance" and design point "near" or also as distance design point and near design point.

Preferably, target values for a spectacle lens design are transformed from already existing target values, i.e. the new target values at the place y result from the old target values at the place y', wherein in particular y'=y−Δy(y).

In a preferred embodiment, $\Delta y(y)=y_0$ is used. If e.g. only the principal direction of sight of a spectacle wearer deviates from the distance reference point of the lens in the vertical direction in the distance, then the spectacle lens design may better suit the spectacle wearer's application if the vertical positioning of the target values is variable or can be adapted, i.e. $\Delta y(y)=y_0$, where $y_0$ is a constant. A positive value of $y_0$ preferably means that the new target values appear to be shifted upward compared to the old reference values.

In a further preferred embodiment, $\Delta y(y)=\alpha y+y_0$ is used. This is particularly advantageous if the target values are to be vertically stretched or compressed in addition to the vertical positioning. More specifically, the design can be stretched with a constant $\alpha>0$ and compressed with $\alpha<0$.

In a further preferred embodiment, $\Delta y(y)=f(y)+y_0$ is used. In particular, a positive value of the derivative $f'(y)$ stands for a local stretching, a negative value for a local compression. Preferably, $f(y)$ is monotonic, and also preferably, $|f'(y)|$ is larger in the progression zone than in the near and the distance portion, or the near and the distance field, in order for same to be affected more strongly by stretching and compression.

FIG. 1 shows two functions $f(y)$ according to a preferred embodiment, wherein FIG. 1a) represents a compression and FIG. 1b) a stretching.

In the following, a non-limiting, exemplary method is described in preferred embodiments of the invention.

In a first preferred embodiment of the exemplary method, the position of the distance and near design points or their deviations from the reference points of the basic design are determined and/or specified in the spectacle lens. Furthermore, the method in this first embodiment comprises determining and calculating a simple and flexible transform for stretching and compression from the differences of the reference points or reference point positions. As defined by the description, a distance and a near design point are in particular understood to be the distance and the near reference point, respectively, of the spectacle lens or the spectacle lens design.

In a second preferred embodiment, the exemplary method alternatively or additionally comprises specifying the transform for stretching and compression. Therewith, preferably the positions of the reference points and the transition are explicitly specified. Preferably, an iteration is performed in order to adjust the reference points to the desired principal visual points.

Preferably, the exemplary method comprises applying the transform to the object distance function in the calculation of the position of wear. Thereby, the coefficients of the object distance function are preferably maintained. Alternatively or additionally, the method comprises preferably automatically adjusting (stretching and/or compression) of the reciprocal object distance along the principal line of sight $S_{1HBL}(y)$ e.g. by means of a two-dimensional Newton iteration.

Preferably, the exemplary method comprises determining and calculating and transforming all optimization values by the Y transform of the evaluation points. The target value functions (for target astigmatism, target refractive power, weighting, etc.) preferably remain original. Preferably, the target astigmatism is scaled, in particular according to the relation $1/l_D$, where $l_D$ represents the progression length of the starting design and I the progression length of the individual lens. This takes in a particularly preferable manner the sentence by Minkwitz into account, according to which the increase in astigmatism changes in a horizontal direction as the progression zone length changes. In a preferred embodiment, the values of the target astigmatism are directly rescaled. In another preferred embodiment, the coefficients of the astigmatism-describing functions are matched.

An optimization of the spectacle lens of the basis of the determined spectacle lens design may then be performed by means of different, already known and established software tools.

In the following, further preferred aspects of the transform or transform function are illustrated according to the preferred embodiments of the present invention. Preferably, a double-asymptote according to $$f(y) = b + \frac{a}{(1+e^{c(y+d)})^m} \tag{19}$$

is used as the function $f(y)$. For a preferred transform function, this yields:

$$y' = y - \Delta y(y) = y - \left(y_0 + \left(b + \frac{a}{(1 + e^{c(y+d)})^m}\right)\right) = y - y_0 - f(y) \quad (20)$$

Here, y is the coordinate in the new spectacle lens design which is to be assigned a specific value of the target values, and y' is the argument for which the unchanged target value function is to be evaluated. The larger the value of the coefficient c, the faster the transition from the near portion asymptote to the distance portion asymptote. For m=1, the function is point-symmetric with respect to y=−d, i.e. the symmetry property $f(-d-y)-f(-d)=-f(-d+y)-f(-d))$ holds true.

If c is selected to be negative, then:
b=value for small y (near portion asymptote)
b+a=value for large y (distance portion asymptote)

Thus, in the upper part of the spectacle lens, one obtains a y shift of a+b and in the lower part a constant y shift as well, but of the value b. The further coefficients c,d and m control the uniform, soft transition. By the proper selection of the coefficient in, the transition from the distance portion asymptote to the near portion asymptote can be specified. In order to obtain the design characteristic, in particular in universal lenses, a value of m≈1 is advantageous.

Calculation of the coefficients from the default values.
$y_F$ distance design point of the individual spectacle lens
$y_N$ near design point of the individual spectacle lens
$y_{FD}$ distance reference point of the starting design
$y_{ND}$ near reference point of the starting design
$l_D=y_{FD}-y_{ND}$ progression length of the starting design
$l=y_F-y_N$ progression length of the individual spectacle lens An example of a stretching transform with given coefficients is illustrated in FIG. 2. The form of the stretching transform and the coefficients thereof can directly be taken from FIG. 2.

The coefficient m controls the symmetry, in FIG. 2 m=1.

In case the transform is specified directly, the coefficients a, b, c, d, m are simply specified for the transform, and the reference points thereof are then determined according to one of the transforms in accordance with one of equations (1) to (7).

In the case of specifying the positions of the distance and near design points or their deviations from the reference points of the basic design, different possibilities can be used for determining the transform coefficients. In the following, two preferred variants will be explained in brief:

a)

$$m = 1, d = -\frac{y_F + y_N}{2};$$

transform symmetrical

In this case, preferably ε values is specified, which determines a factor 1ε by which the distance a between the distance and near portions asymptotes exceeds the change of the progression length (a typical value is e.g. ε=0.01). Then, the remaining coefficients are preferably determined according to $$c = \frac{2\ln\left(\frac{\varepsilon}{2+\varepsilon}\right)}{l} \quad (21)$$

$$f_M = 1 + e^{-\frac{cl}{2}}; \quad f_P = 1 + e^{\frac{cl}{2}}$$

$$a = \frac{l - l_D}{f_P^{-1} - f_M^{-1}}$$

$$b = \frac{f_M(l - l_D)}{f_P - f_M}$$

$$y_0 = y_F - y_{FD}$$

b) m and d are arbitrarily set.

In this case, c may be specified as well, and a and b are to be determined preferably numerically by a Newton iteration such that with $y_0=y_F-y_{FD}$ one of the transforms according to equation:

$$y'=y-\Delta y(y)=y-y_0 f(y) \quad (22),$$

where $f(y)$ is a function according to one of equations (1) to (7), in particular equation (1), is satisfied for the near and distance reference points, i.e.:

$$y_{FD}=y_f-\Delta y(y_F) \text{ and } y_{ND}=y_N-\Delta y(y_N) \quad (23)$$

In the following, the preferably automatic matching (stretching and/or compression) of the reciprocal object distance along the principal line of sight $S_{1HBL}(y)=S_1(x=x_0(y), y)$ will be explained in more detail in accordance with preferred embodiments. In particular, it preferably holds true that $S_1(x=x_0(y),y)=S_1(u_0,y)$, where $x_0(y)$ is the horizontal coordinate of a point on the principal line.

For example, the following Gaussian lens formulas form the basis:

$$\frac{1}{s'} = \frac{1}{s} + \frac{1}{f'} \quad (24)$$

$$S_1' = S_1 + F$$

$$F = S_1' - S_1$$

When looking from the distance portion of the spectacle lens along the principal line of sight into the near portion, the following approx. applies for each point:

$$F(u_0,y)=S'_1(u_0,y)-S_1(u_0,y) \quad (25)$$

where
F refractive power of the spectacle lens
$S_1$ reciprocal object distance
$S'_1$ reciprocal, image-side vertex length, in the normal case=0 or −Akk(y) (accommodation of the eye).

In order for the refractive power course in the spectacle lens to be also preferably automatically matched to the new positions of the reference points in the spectacle lens during the lens optimization in correspondence to the above-described stretching and compression, the function $S_1(u_0,y)$ is correspondingly altered as well. Preferably, $S_1(u_0,y)$ is not set freely but by means of a suitable function in order to maintain the design characteristic. It is advantageous to also describe the reciprocal object distance in the starting lens (design input) as a double-asymptote function of the form:

$$S_1(u_0, y) = b_s + \frac{a_s}{(1 + e^{c_s(y-y_0+d_s)})^{m_s}} \quad (26)$$

and to only determine the coefficients $c_s$ and $d_s$ by means of a simple Newton iteration (e.g. according to the textbook "Numerical Recipes", ISBN 052138330) such that with the changed coefficients in the new reference points the values of $S_1$ exactly correspond to those of the old coefficients in the original reference points.

Compared with the application of the transform to the object distance function in the calculation of the position of wear (with coefficients of the object distance function maintained), this approach is advantageous in that with the changed object distance function all calculation and evaluation programs capable of accessing the object distance function and already existing outside the optimization program can still be used as always (e.g. target value calculation for the fabrication, comparison of target and actual values, etc.).

Further features and advantages of preferred embodiments of the present invention can be taken from the further accompanying drawings.

Here, isoastigmatism values for the target astigmatism are shown according to the specified starting design.

The distance reference point ($B_F$) and the near reference point ($B_N$) for this design are each marked with a circle. $B_Z$ designates the fitting or centration point.

Figures 1A, 1B:
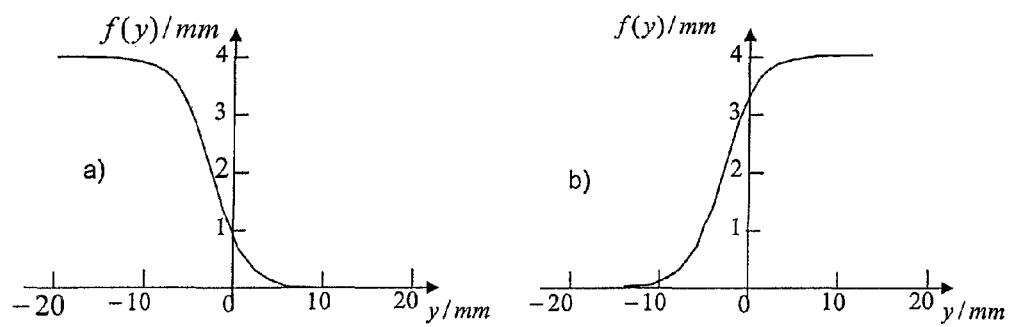
Figure 2:
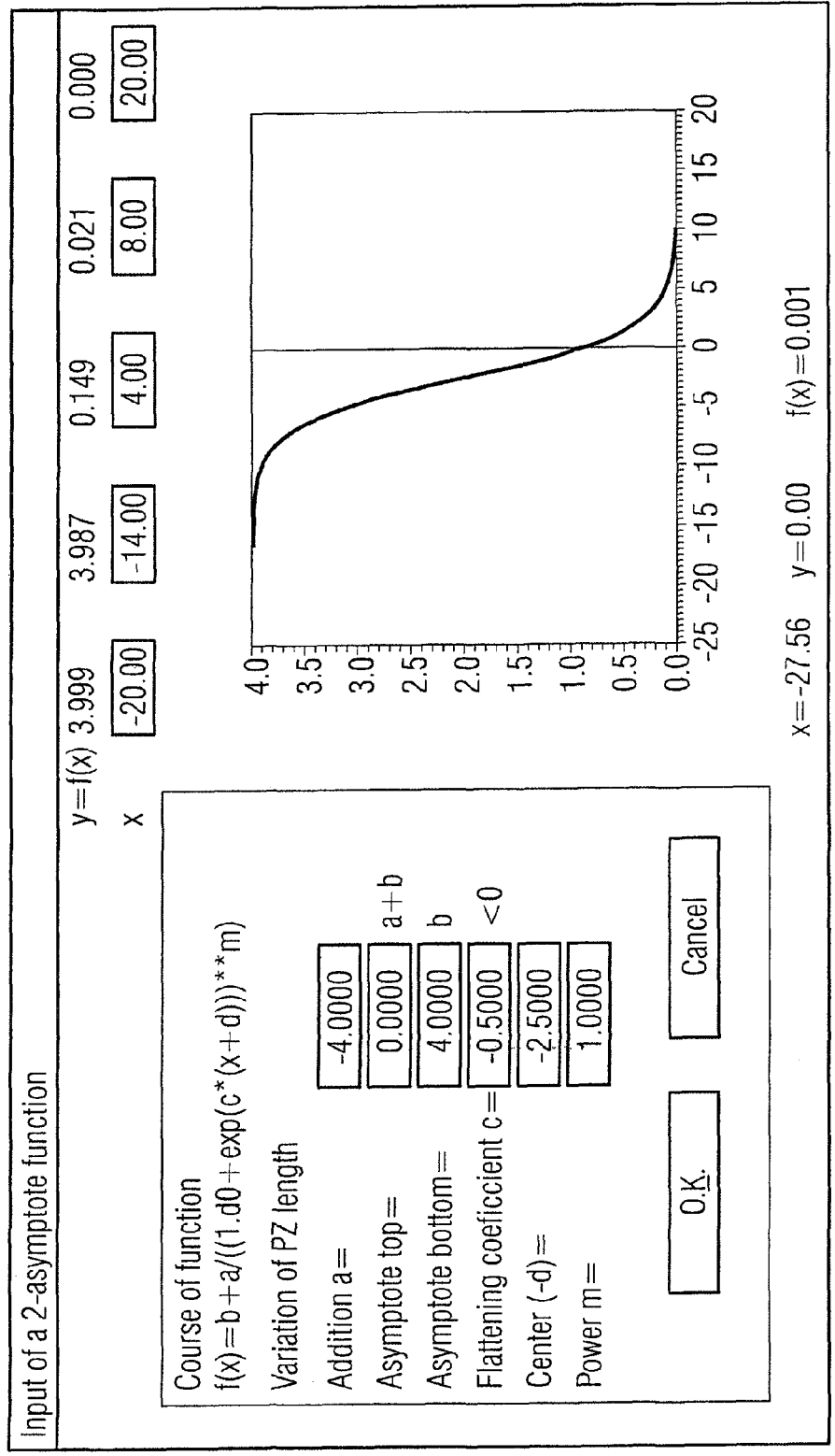
Figure 3:
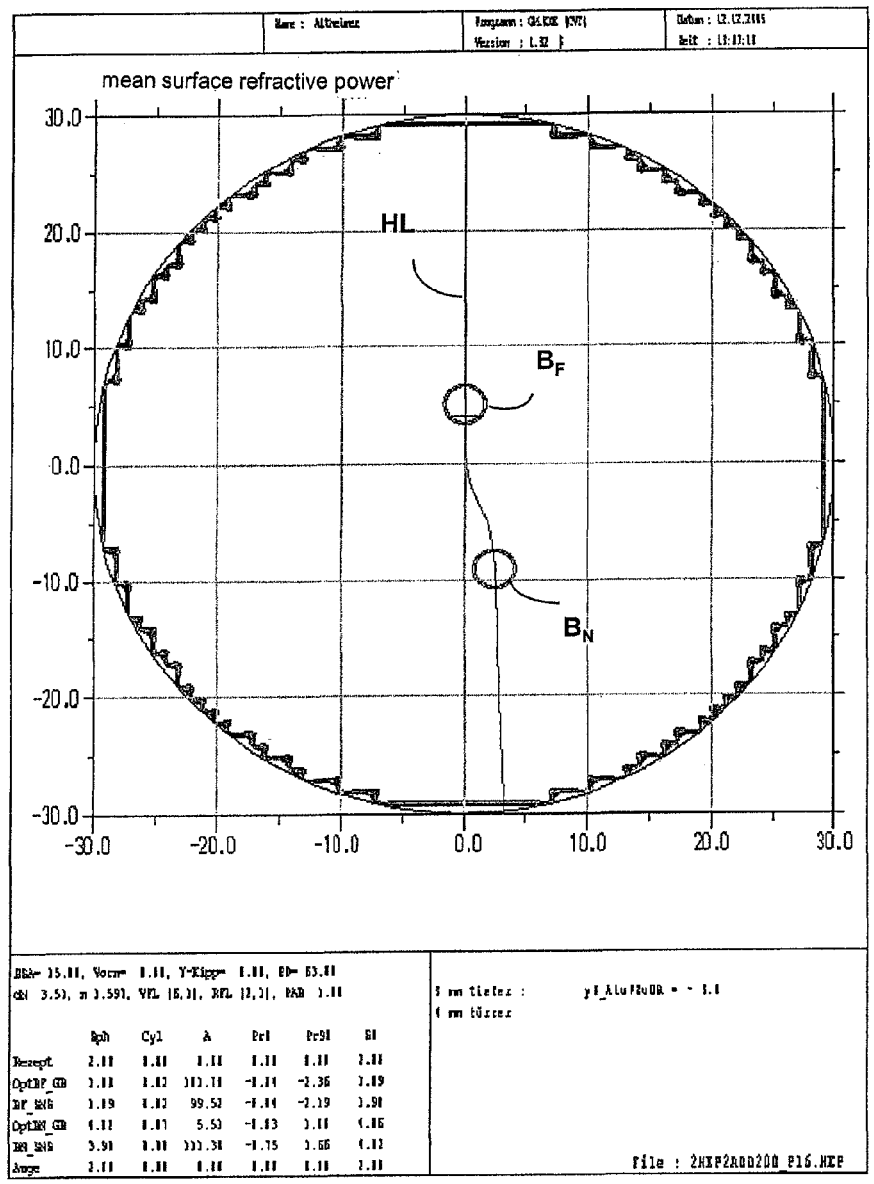
FIG. 3 shows a course of the principal line HL for an exemplary spectacle lens. Moreover, the distance and near reference points are each marked with a circle. $B_F$ designates the distance reference point and $B_F$ the near reference point.
Figure 4:
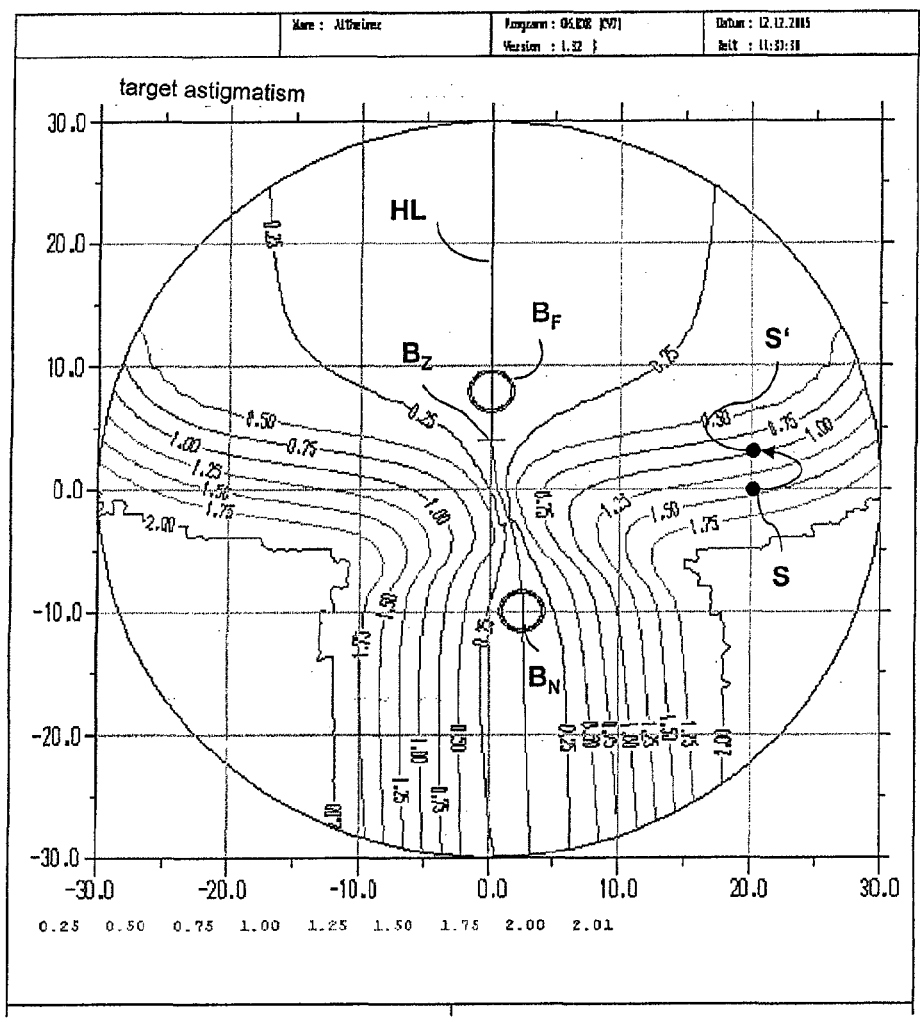
FIG. 4 shows an exemplary starting design (also referred to as basic design or initial design) for a spectacle lens with powers:
spherical (sph)=0.0 D,
astigmatic (cyl)=0.0 D;
axis (A)=0°;
prismatic (pr)=0 cm/m;
prism base=0°;
addition (add)=2.0 D.
Figure 5:
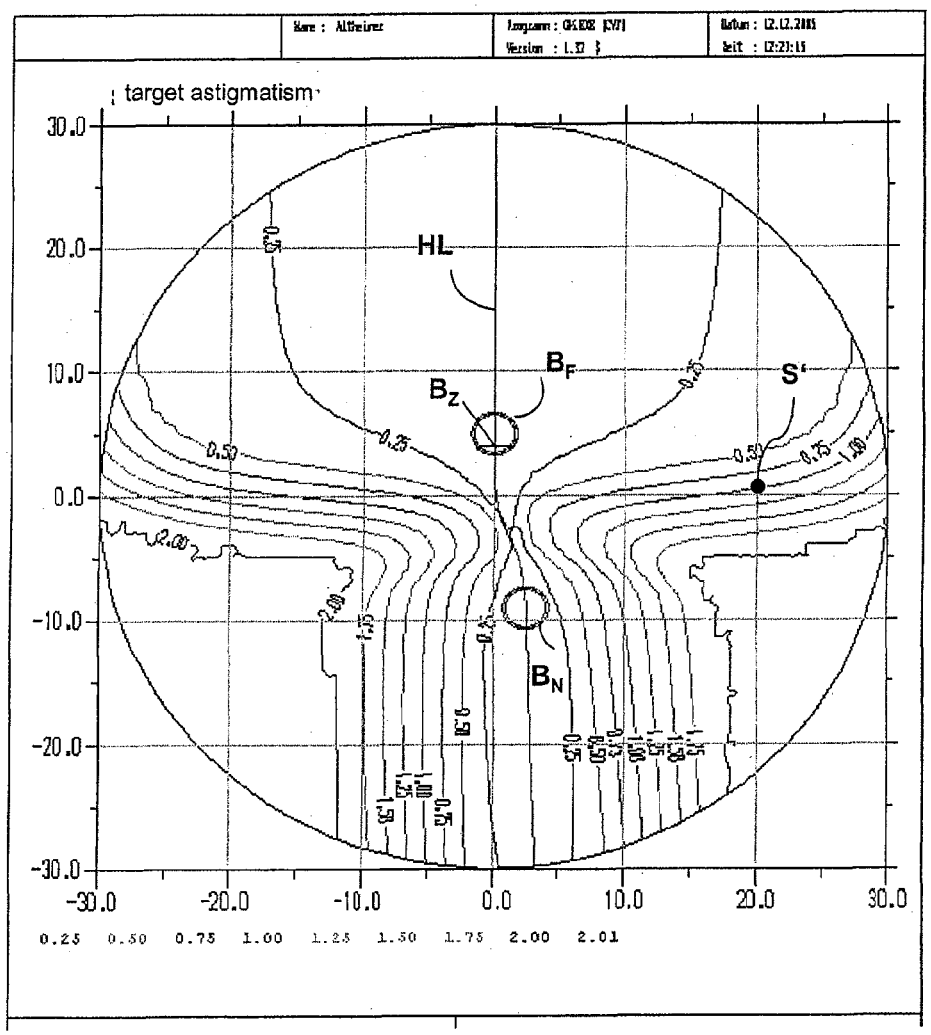

By analogy with FIG. 4, FIG. 5 shows an exemplary spectacle lens design determined from the starting design of FIG. 4 by means of a method according to a preferred embodiment of the present invention. In particular, the transform has been performed in accordance with the transform $$y' = y - \Delta y(y) = y - \left(y_0 + \left(b + \frac{a}{(1 + e^{c(y+d)})^m}\right)\right), \quad (27)$$

exemplarily shown in FIG. 2. This transform at least partly comprises a compression such that the progression length or corridor length is reduced.

In FIGS. 4 and 5, the point S designates a point of the starting design. As described above, the point S is transformed into the point S' of the derived design.

Preferably, the progression zone length is at least variable in a range of 14 to 18 mm.

Furthermore, an optimizing tool for determining and providing the target values and models is provided, which comprises a checking module for checking the ordered parameters for plausibility.

FIG. 6 shows an exemplary user input interface 10 for inputting and specifying desired marginal conditions and/or transforms and/or positions of reference points.

The user input interface 10 comprises a first section 12 for inputting target values of the spherical, astigmatic and prismatic powers of the spectacle lens (sphere, cylinder, axis, addition, horizontal prism, vertical prism, prism and base) determined e.g. by means of refraction. All data preferably refer to data in the position of wear of the spectacle lens.

Furthermore, the user input interface 10 comprises a section 14 for inputting frame and centration values (pupillary distance, corneal vertex distance, ocular center of rotation distance, ocular center of rotation (x, y and z coordinates), angle between the zero direction of sight and the z axis, decentration (x, y and z coordinates), etc.).

Figure 7A:
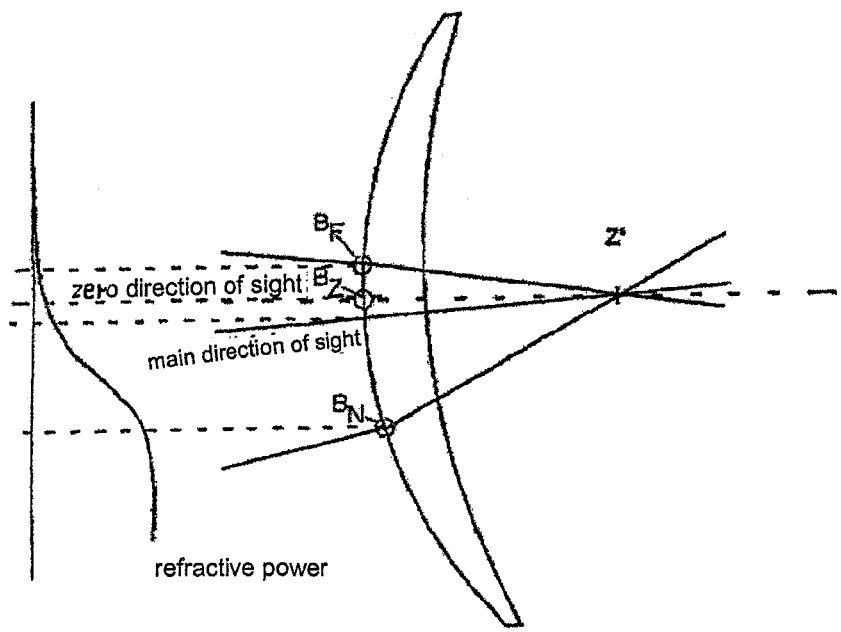
Figure 7B:
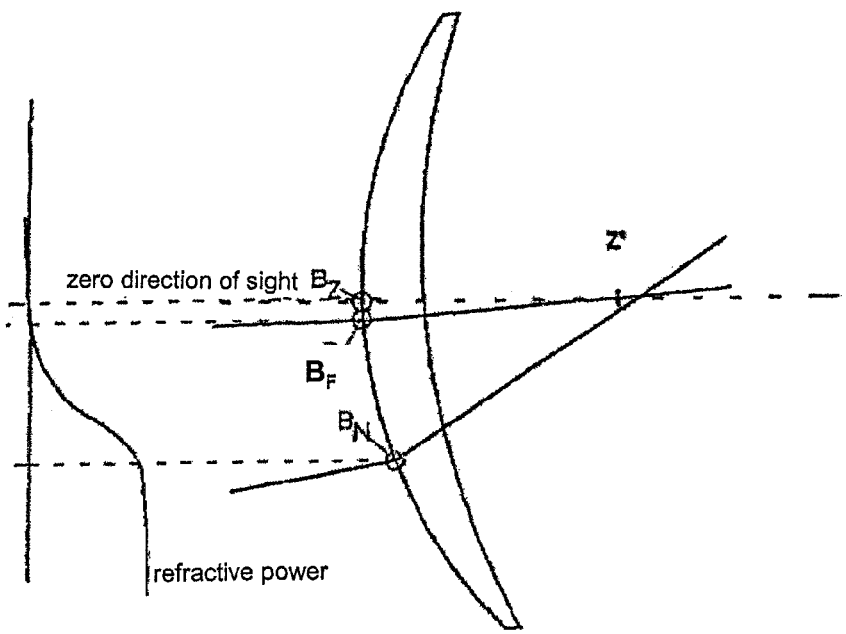
Figures 8A, 8B:
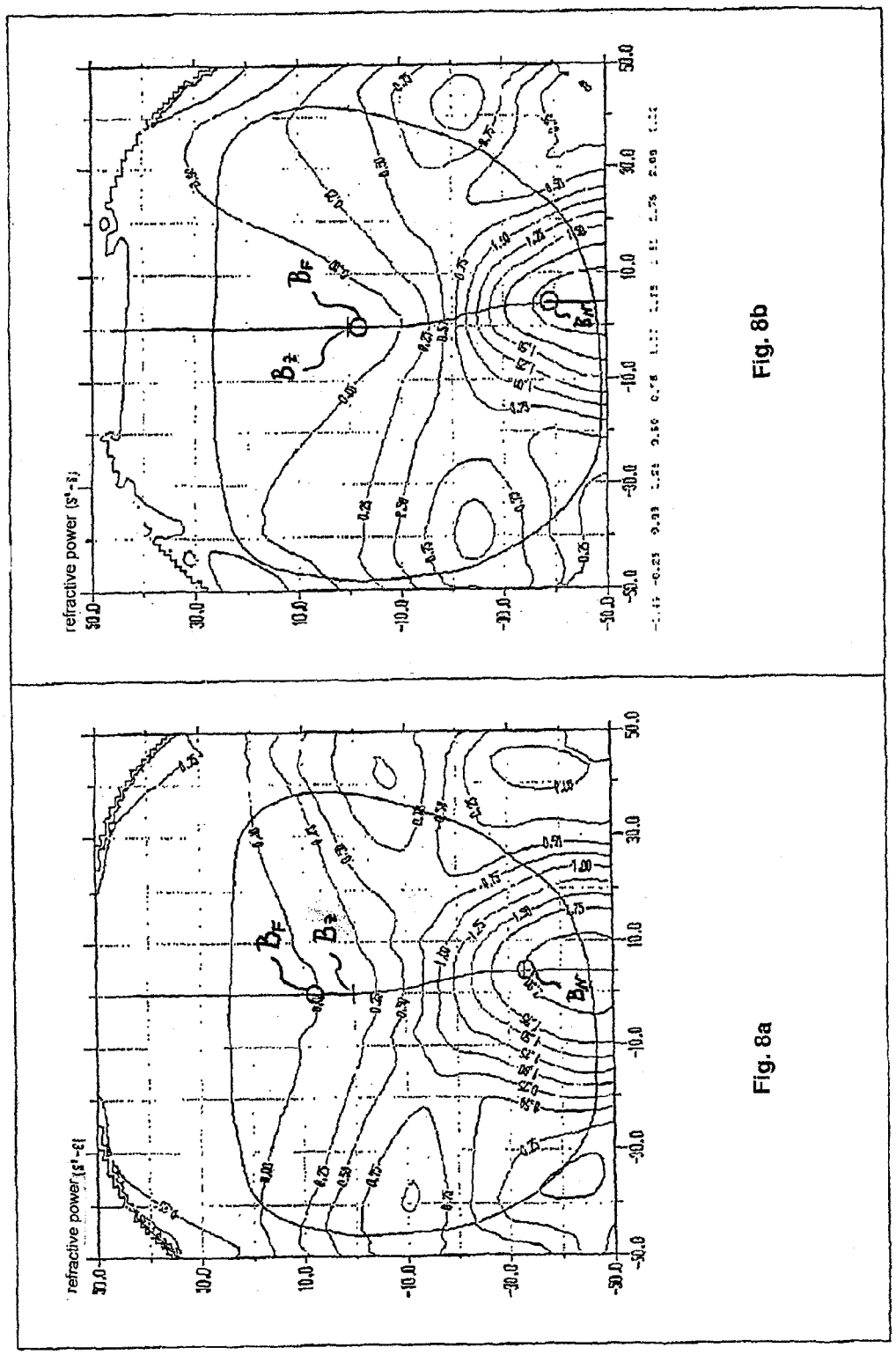

FIGS. 7a and 7b show an exemplary cross-section of a spectacle lens in an position of wear, wherein the centration point is located in the pupil center in the zero direction of sight of the spectacle wearer. The spectacle lens has a spherical power of 0.00 D and an addition of 2.00 D. FIGS. 7a and 7b also show the respective refractive power course along the principal line of the spectacle lens.

FIG. 7a shows a spectacle lens of the prior art, FIG. 7b a spectacle lens with individual positions of the distance and near reference points. The distance reference point $B_F$ of the spectacle lens shown in FIG. 7b is located 5 mm further downward than the distance reference point $B_F$ of the spectacle lens shown in FIG. 7a. Z' designates the ocular center of rotation.

By analogy with FIGS. 4 and 5, FIGS. 8 and 9 show further embodiments for transforms according to preferred embodiments of the present invention on the basis of isoastigmatism illustrations (FIG. 9) and isolines of the refractive power (FIG. 8) of a basic design (FIGS. 8a, 9a) and an individual design (FIGS. 8b, 9b) derived therefrom.

The coordinate system in FIGS. 3 to 5 and 8 and 9 is the above-defined coordinate system, wherein the coordinate zero point coincides with the geometric center of the raw-round spectacle lens.

Further embodiments, advantages and characteristics of the invention can be taken from the accompanying exemplary, non-limiting description pages.

In the following, the individually determinable distance and near reference points will be referred to as design point "distance" and design point "near", respectively. In particular, the individually determined distance reference point or design point "distance" corresponds to the point by which the spectacle wearer is optimally corrected in their distance vision and which corresponds to the personal viewing habits of the spectacle wearer. The individually determined near reference point or design point "near" corresponds to the point by which the spectacle wearer is optimally corrected in their near vision tasks and can lower their view in a way comfortable to them.

Conventional progressive spectacle lenses (multifocal lenses) usually comprise a progressive front surface, while the prescription surface on the eye-side is fabricated after receipt of order. In the fabrication according to the base curve system, a limited number (e.g. 72) of progressive surfaces is used, which are adapted to visual defects, are prefabricated and thus standardized. However, these do not apply separately to each power, but to a certain spectrum of the power range. The optimization of the progressive surfaces only takes place for the mean power per base curve or power range. If the refraction data deviates from the optimized powers, it results in restrictions of the usable viewing zones.

In conventional progressive lenses, already small deviations of the ordered powers in sphere, cylinder, axis or also prism and base from the calculation underlying the blank restrict the possibility that a design lives on, which may cause discomfort with the user. In addition, the optimization of conventional progressive lenses is only based on standard values which often do not satisfy the individuality of the lens, frame and customer data of the spectacle wearer.

In the power-optimized progressive lenses, the disadvantages of the conventional progressive lenses are eliminated by an aspherical or atoric prescription surface optimized online for each power combination individually. By means of the Freiformtechnologie (free form technology), it is possible to fabricate power-optimized progressive lenses. Depending on the calculation and fabrication know-how, individual progressive lenses may be fabricated with the Freiformtechnologie as well.

Furthermore, individual progressive lenses are known which can be optimized and calculated taking the individual prescription (sph, cyl, axis, add, prism, base) and the individual positions of the lenses in front of the spectacle wearer's eye (CVD, FFA, forward inclination, pupillary distance) into account.

A second group of individual progressive lenses is progressive lenses personalized in a different manner, e.g. by personal behaviors of the spectacle wearer or their preferences. However, these progressive lenses do not or only partly consider the individual parameters. These progressive lenses are based on a physiognomic standard model usually not corresponding to the actual circumstances and thus leading to optical deviations and/or performance losses.

In all cases however, the design of a progressive spectacle lens has been fixedly defined so far. With a preferred inventive method, it is possible to tailor the spectacle lens design to the customer needs, wherein individual customer parameters (e.g. pupillary distance (PD), corneal vertex distance (CVD), frame shape, forward inclination (FI), face form angle, individual position of the distance and/or the near reference point, individual near distance, etc.) are taken into account.

Preferably, the viewing experience and the needs or vision needs of a customer are taken into account in a preferred inventive method for calculating an individual design and for producing a spectacle lens. Thus, it is possible to create an individual progressive spectacle lens using the technical know-how e.g. of an optician with the collaboration of the customer (spectacle wearer). Preferably, advantages and disadvantages of the previous model are taken into account.

The individual parameters (e.g. pupillary distance PD, corneal vertex distance CVD, forward inclination FI, face form angle FFA, etc.), which are for example automatically determined by means of a suitable 3D measuring apparatus, such as by means of the 3D video centering apparatus ImpressionIST by the company Rodenstock GmbH, or alternatively by means of conventional measuring tools, are taken into account in the calculation or optimization of the spatial locations, in particular the vertical and/or the horizontal position of the distance and/or the near reference point.

The individual parameters may vary in the following ranges:
  pupillary distance (PD): 30 to 80 mm
  corneal vertex distance (CVD): 3 to 50 mm
  forward inclination (FI): −10 to +20 degrees
  face form angle (FFA): −10 to +35 degrees.

Moreover, the special viewing habits of the spectacle wearer may be considered in addition to the individual parameters.

Figure 10:
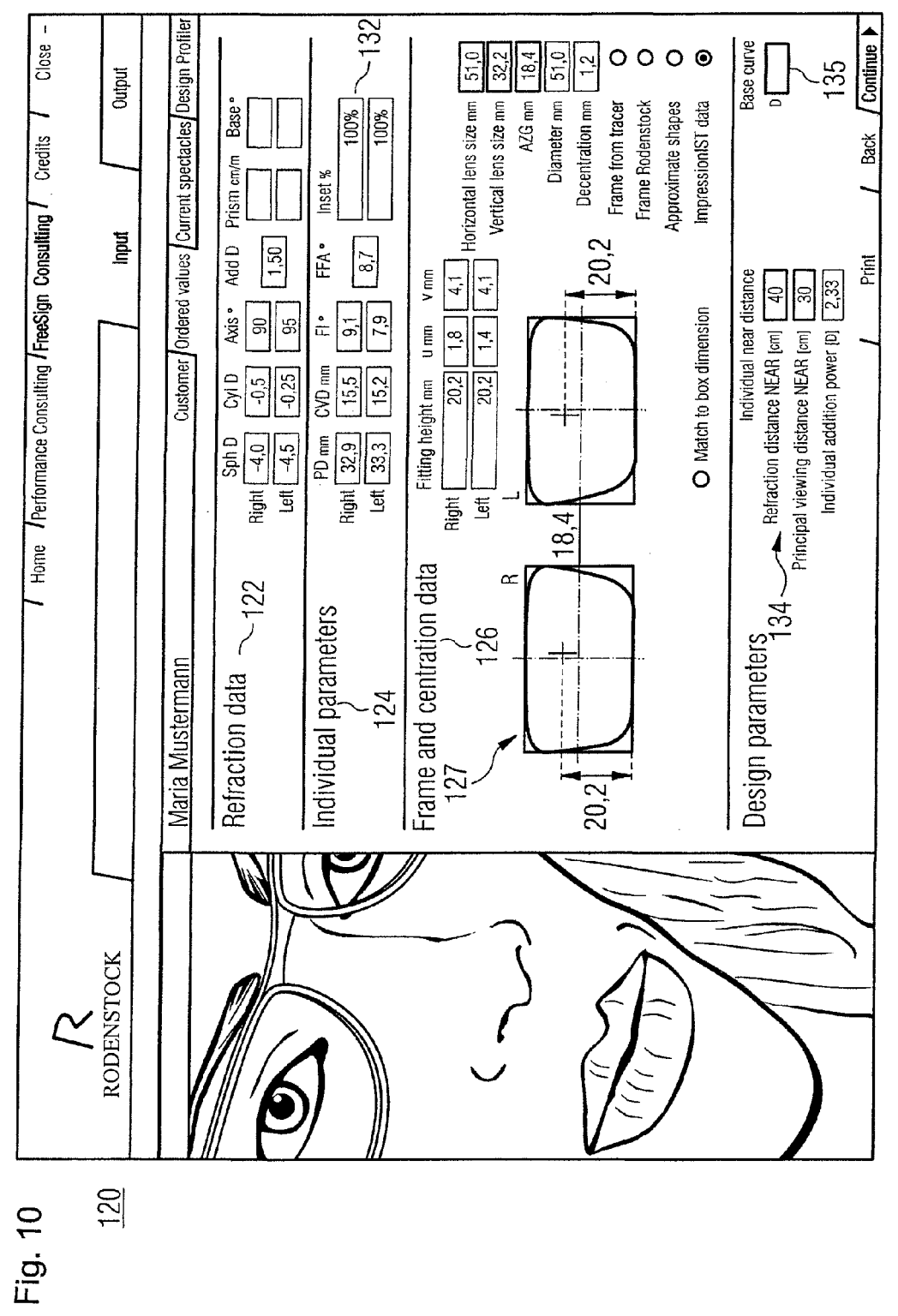
Figure 11:
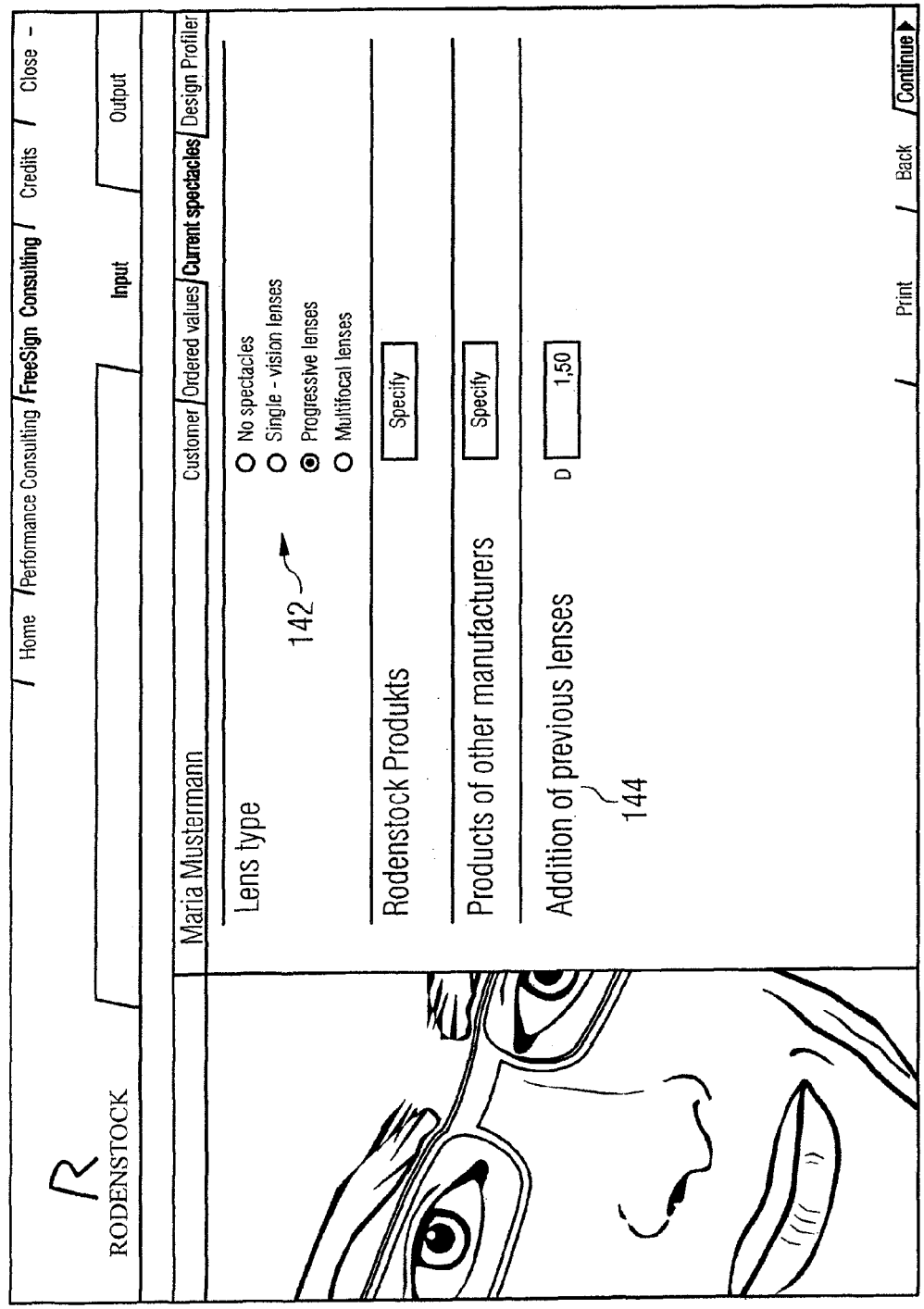
Figure 12:

FIGS. 10 to 12 show graphical user interfaces for inputting individual customer parameters.

For example, in a first mask or graphical user interface (not shown), information on the customer (e.g. name, contact address, frame selection, etc.) can be input or e.g. be imported from a database. The selected frame, which can be directly measured by means of a suitable tracer (e.g. ImpressioniST by the company Rodenstock) or be retrieved from a database, can also be displayed.

FIG. 10 shows an example of a mask or graphical user interface 120 for inputting individual data (prescription values) of the spectacle wearer. The individual data can directly be input into the corresponding input fields or sections of the mask or graphical user interface, or be e.g. retrieved from a database. The fields with a gray background are automatically calculated and filled with data by the program.

The graphical user interface 120 shown in FIG. 10 includes:
  a section "refraction data" (section 122) comprising input fields for inputting individual refraction data, such as sphere "sph", cylinder "cyl", axis, prism, base);
  a section "individual parameters" (section 124) comprising input fields for inputting individual parameters of the spectacle wearer's eyes and/or the individual position of wear (pupillary distance "PD", corneal vertex distance "CVD", forward inclination "FI", face form angle "FFA");
  a section "frame and centration data" (section 126) comprising input fields for inputting frame and centration data (fitting height, horizontal lens size, vertical lens size, distance between lenses "AZG") and optionally a display section (section 127) for displaying the centration of the spectacles matched to the box dimension.

The frame data can be input into corresponding input fields. These values can be entered automatically if the frame is e.g. selected by means of a tracer or from a list of frames. The centration data can optionally directly be applied from a 3D video centering system (e.g. 3D video centering system by the company Rodenstock GmbH). With a function "match to box dimension", the frame can be matched to the possibly changed frame data.

In section 126 "frame and centration data", a frame can be selected from a database e.g. if no frame has been applied or measured by means of a tracer before. In particular, the frame can be selected from a list in an opening pop-up window. The shape and frame data are preferably displayed as well. The selection can be applied by confirming it. Also, an approximate frame can be selected from a number of different frame shapes ("approximate shapes"). Here, another pop-up window may open in which the frame can be selected from a choice of common shapes.

The graphical user interface 120 shown in FIG. 10 further comprises a section or input field "Inset" (section 132). If the spectacle wearer has a convergence behavior in near vision deviating from the standard case, the default value in the input field "Inset" can be changed as appropriate. Preferably, the inset value is calculated considering the individual customer parameters.

Also, the graphical user interface 120 comprises a section 134 "Design Parameter" with corresponding input fields for inputting:
  the individual near distance in the refraction determination (refraction distance near);
  the principal viewing distance near; and
  the individual addition power.

If no data regarding the individual near distance is input, it is assumed that up to an addition of 2.5 D, the individual near distance is 40 cm in the refraction determination. In other words, it is assumed that the ordered addition was determined in 40 cm and that also the principal viewing distance of the spectacle wearer is at this distance. In the case of higher additions, the reciprocal of the addition corresponds to the maximum near distance. If only one of the two input fields "Refraction Distance Near" and "Principal Viewing Distance Near" is filled, it is assumed that the value also holds true for the respective other distance. The inset and the astigmatism are calculated for the principal viewing distance "near".

If different values for the refraction distance "near" and the principal viewing distance "near" are entered into the corresponding input fields, the individual addition power for the principal viewing distance is automatically calculated as well. The individual addition power is displayed if it lies outside the delivery range (0.75 D to 3.50 D) or deviates more than 0.5 D from the ordered addition.

Example ordered addition (refraction)=2.00 D, principal viewing distance near=30 cm, refraction distance near=40 cm. The ordered addition of 2.00 D is optimized for 30 cm and the addition is adapted. In addition to the inset, the astigmatism of oblique incidence is corrected for the desired principal viewing distance.

Now, if only one distance (principal viewing distance or refraction distance) is specified, it is assumed that the ordered addition relates to the given distance. Here, no adaptation of the addition takes place and the spectacle lens design or the spectacle lens is calculated and optimized for the ordered addition in the specified near distance. If no near distance (principal viewing direction and/or refraction distance) is specified, it is assumed that refraction has been performed in 40 cm and that this refraction distance corresponds to the principal viewing direction in near vision. Here, no adaptation of the addition takes place and the spectacle lens design or the spectacle lens is calculated and optimized for the ordered addition for 40 cm. Usually, the addition available from the manufacturers lie in a range between 0.75 D and 3.5 D. On the basis of the following simple calculation, the optician can check whether the spectacle lens is available:

$$IZ(dpt) = \text{Add}\,(dpt) - \left(\frac{1}{RDN(m)}\right) + \left(\frac{1}{MVDN(m)}\right),$$

where:
IZ is the individual addition power in D;
Add is the addition in D;
RDN is the amount of the refraction distance near in meters; and
MVDN is the amount of the principal viewing distance near.

Examples

Possible addition refraction=1.75 D;
refraction distance near=40 cm;
principal viewing distance near=30 cm;
IZ=1.75 D−2.50 D+3.33 D=2.58 D.
Not Possible:
addition refraction=2.00 D;
refraction distance near=40 cm;
principal viewing distance near=20 cm;
IZ=2.00 D−2.50 D+5.00 D=4.50 D In the calculation, it is assumed that no change of the amplitude of accommodation due to the change of the near distance occurs. However, this merely represents an approximation.

The graphical user interface 120 shown in FIG. 10 further comprises a section or input field "Base Curve" (section 135) into which the base curve fitting the selected frame best can be entered. In particular, it is possible to input a deviating base curve depending on the bending of the spectacles frame and to consider it in the optimization of the spectacle lens. The program automatically calculates the best-suitable bending or base curve for the respective refraction data and the respective base curve needs. The base curve calculated by the program may differ from the base curve input into the input field "Base Curve". Preferably, the input or ordered base curve is checked automatically as to that no plane and convex surface on the backside or back surfaces curved to strongly arise, which may in particular cause too high an edge thickness.

FIG. 11 shows a mask or graphical user interface 140 for inputting individual data relating to the current, so far worn spectacles.

Information on the previous lenses can be entered into this mask, if known. For example, it can be selected from a list 142 ("lens type") whether the customer had single-vision, multifocal or progressive lenses or whether it is the first spectacle lens of the customer (no previous spectacle lenses). If progressive lenses were worn, further information on e.g. the material, the refractive power and/or the progression length may be made e.g. in a pop-up menu. Furthermore, the progression length of the previous spectacle lenses can be input automatically on the basis of the selected previous product, or manually. In particular, the progression length of the previous spectacle lenses may roughly be classified as e.g. a "standard" or long progression or as a short ("XS") progression length.

If the addition of the previous lenses is known, it can be entered into a dedicated input field 144 "Addition of the Previous Lenses". Thus, the addition of the previous lenses can be compared to the new addition. In the case of an addition increase of more than 0.5 D, a note field (e.g. as a pop-up window) may come up, which points out to the particularities of the addition increase.

FIG. 12 shows an example of a mask or graphical user interface 146 ("Design Profiler") for inputting data relating to the individual preferences and weighing of the viewing zones.

Five different pictographs for the distance, intermediate distance and near as well as the active behavior of the spectacle wearer each symbolize the zones the spectacle wearer should weigh up when choosing their design profile. The pictographs serve as examples of the respective distance zone and only represent a small selection of possible activities for that distance. With the points to be allocated, the zones can be weighted.

In a specific example, a total of 9 points can be allocated to the four different zones (distance, intermediate distance, near and active behavior). The more important the respective distance zone is to the customer and the more of their activities fall into a zone, the more points are allocated for this zone. The number of points per zone and the overall number can be restricted. For example, a maximum of 5 points may be allocated to one zone, but not more than 9 in total.

The allocated points determine the spectacle wearer's individual design profile. Expressed in simplified terms: The more points are allocated to the distance in relation to the given overall points, the lower is the individual distance reference point, and the more points are allocated to near in relation to the overall points, the higher is the individual near reference point. The points for the active behavior and the intermediate-distance vision mainly influence the length of the progression zone and thus also determine how distortion-free the spectacle lens is. An allocation of the same number of points to each zone corresponds to a balanced, universal design.

FIG. 13 shows the positions of the distance and near reference points of an individual spectacle lens design 148. The zones (150 and 152) in which the distance reference point (zone 150) and the near reference point (zone 152) can preferably be found have a gray background. The position of the centration or fitting point is marked by means of a cross 154 (centration cross). The distance reference point is in the middle of two round brackets 156. The near reference point is in the middle of the near measuring circle 158.

The vertical height of the distance reference point can preferably be determined flexibly, depending on the individual data of the spectacle wearer, in a range between +4 to −4 mm with respect to the centration or fitting point set for this spectacle lens by the manufacturer. The near reference point can preferably be determined flexibly between 13 and 20 mm vertically below the centration or fitting point. This results in a flexibly selectable progression length, which may preferably have a minimum of 13 mm and a maximum of 24 mm. Preferably, the distance and near reference points can be freely determined in steps of 0.1 mm within an admissible range. If e.g. the distance reference point is shifted to a vertical height and/or of −4 mm, the near reference point has to at least be at a vertical height of −17 mm. If the distance reference point is shifted to +4 mm, a minimum progression length of 17 mm results, since the near reference point preferably is not shifted to more than −13 mm.

The minimum vertical distance from the lower frame edge to the near reference point is preferably 2 mm. The distance reference point preferably has a minimum vertical distance of 6 mm, preferably of 8 mm, from the upper frame edge. The maximally admissible progression length can be calculated with the help of the minimally admissible distances of the distance and near reference points from the upper and lower frame edge, respectively. The progression length is defined as the vertical distance between the distance reference point and the near reference point.

The effects achieved by shifting the design point in the progressive lens can be taken from the following table:

TABLE

| Individual vision needs of the spectacle wearer | Implementation during determination of the positions of the design points |
| --- | --- |
| Particularly large distance zone, e.g. driver | The design point "distance" should be shifted below the centration cross. The progression zone then only (clearly) begins below the centration cross. |
| Particularly large near zone, e.g. editor | The design point "near" should be shifted upward compared to the previous progressive lens. This allows for a relaxed near vision with a comfortable infraduction at the same time. |
| Particularly wide progression zone, e.g. architect | The design point "distance" should be shifted upward and the design point "near" downward. The longer the progression zone, the wider the progression corridor and the less rocking motion the customer notices. |

The positions of the distance and near reference points are preferably the same for the right and left spectacle lenses. However, in the case of different visual heights, the viewing zones of one of the eyes may be negatively affected. In order for the viewing zones of both eyes to be fully used, it is advantageous to select and determine the respective smaller vertical distance of the near reference point from the centration point.

FIG. 14 explains this relation. In FIG. 14:

$F1^{L,R}$ designates the vertical distance "centration point—upper frame edge" of the left (L) and the right (R) spectacle lens; and $F2^{L,R}$ designates the vertical distance "lower centration point—lower frame edge" of the left (L) and the right (R) spectacle lens.

In FIG. 14, the centration point and the distance reference point coincide. If the selection of the suitable vertical position of the near reference point is made on the basis of the lower frame edge, a vertical distance of the near reference point from the centration point of −18 mm would result for the right eye, and said distance would be −17 mm for the left eye. In this case, it is preferred to select and determine the smaller distance.

The data on the object distances "distance" and "near" in the refraction determination is taken into account in the calculation or optimization. Thus, the beam path corresponding to the actual situation of wear can be simulated more precisely and the imaging quality can consequently be improved.

In particular, it is possible to take the principal viewing distance in near vision in the actual position of wear of the spectacle lens into account when calculating the lens. FIG. 15a illustrates the principal viewing distance in near vision in the actual position of wear of the spectacle lens and FIG. 15b the refraction distance near or near distance in the refraction determination.

Generally, it is assumed that the addition has been determined in a near refraction distance of 40 cm (applies to additions up to 2.50 D, for higher additions, 1/addition holds true) and that it corresponds to a principal viewing distance in near vision of 40 cm. If the principal viewing distance in near vision deviates for the near refraction distance, the individual spectacle lens design can be optimized for this principal viewing direction.

When the optimum individual position of the distance and/or the near reference point is determined on the basis of individual data of the spectacle wearer, a corresponding spectacle lens design with the thus determined positions of the distance and near reference points, and optionally considering further individual parameters of the spectacle wearer, is calculated automatically.

Figure 16:
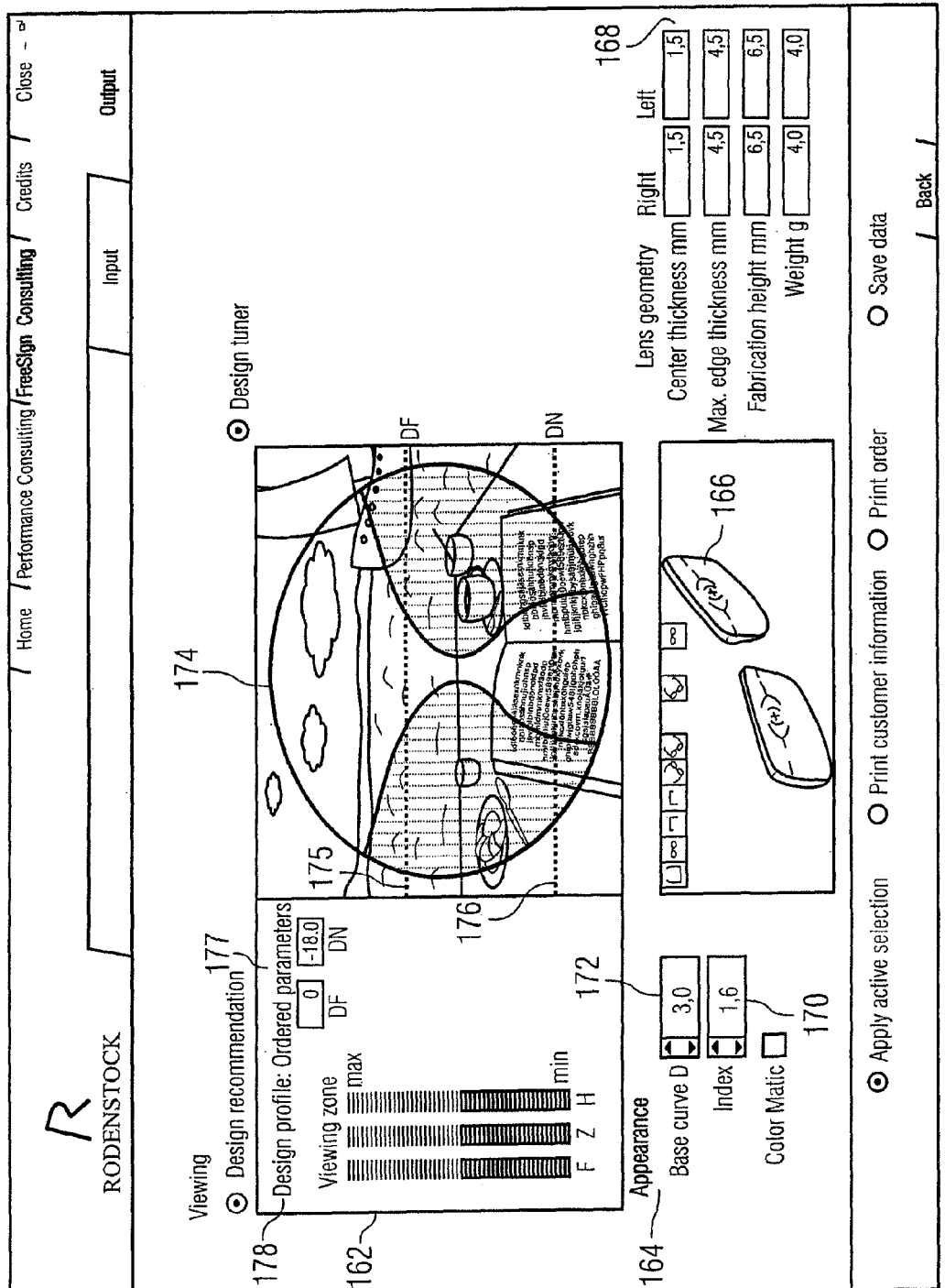

As shown in FIG. 16, the design proposal can be visualized by means of a suitable graphical user interface 160A in order to represent the result (design recommendation). Depending on the selection in the settings, an additional graphical user interface 160B (design tuner) may be shown (cf. FIG. 17) with which, in addition to a result representation, the user is given the possibility to actively change the design by changing the individual position of the distance and/or the near reference point and/or by changing the individual data of the spectacle wearer (in particular the preferences, the frame data, etc.). In addition, the corresponding geometric data of the spectacle lens (center thickness, edge thickness, base curve, weight) can be calculated and be visualized as well by means of a suitable graphical user interface (preferably in the form of a three-dimensional module).

The graphical user interfaces 160A and 160B are divided into two areas: In the upper area 162, information on "Viewing" and/or "Performance" with the proposed individual spectacle lens design are illustrated; in the lower area 164, information on "Appearance" and "Geometry" of the individual spectacle lens or spectacles are illustrated.

In the area "Appearance" 164, in particular cosmetic properties and data regarding the aesthetics of the spectacle lens (e.g. weight, geometric data, such as fabrication height, maximum edge thickness, center thickness, base curve, etc.) of the edged spectacle lens(es) can be visualized and graphically illustrated. The visualization of the cosmetic properties of the spectacle lens may e.g. be achieved by means of a three-dimensional graphical representation of a model of the spectacle lens 166 with the determined geometric data, as is e.g. shown in FIGS. 16 and 17. The representation of the cosmetic properties of the spectacle lens may be influenced by selection of the base curve and the refractive index. The selection may depend on the power.

Furthermore, the area "Appearance" 164 may comprise a sub-area 168 in which numerical values relating to the geometric properties of the spectacle lens, such as fabrication height, maximum edge thickness, center thickness, weight, base curve of the edged lens, etc. are shown. These values may be approximate values which optionally deviate from the actual lens geometry data. In addition to the engravings, individually determined distance and near reference points may be shown as marking points.

Views 169 of the edged spectacle lenses can be shown from different static perspectives (frame from above, frame from the front, from the side, from diagonally above) by means of suitable buttons. Moreover, the edged spectacle lenses can be made to rotate dynamically in the selected view by pressing an animation button. For a more detailed view, the image may be enlarged by means of a corresponding button.

Furthermore, the area "Appearance" 164 comprises a section 170 for displaying numerical values relating to the refractive index and a section for displaying the base curve (section 172). The displayed values for the base curve and the refractive index are composed of the power range, the necessary diameter, the base curve wish, and the refraction data. Therefore, deviations from the base curve wish input into the mask "Ordered Values" are possible. The technically realizable values for the base curve and the refractive index of the lens can be changed via corresponding selection fields. If changes of the default base curve, the refractive index, etc. are made, the graphical illustration and the geometric data can be calculated again according to the changed values by pressing the button "Refresh".

In addition to the visualization of the cosmetic properties of the spectacle lens, a visualization of the optical properties of the spectacle lens takes place (viewing zones, in particular spatial location and size of the individual viewing zones). The representation of the sizes of the viewing zones can merely take place relative to the prescription data without taking a possible material dependence into account. Of course, consideration of a material dependence may be provided for. In addition to a visualization of the "Appearance", a visualization of the "Viewing" through the spectacle lens takes place as well. In particular, a visualization of the viewing comfort (e.g. infraduction, rocking, peripheral vision, distortions, etc.) may be provided for.

In addition, a suitable representation of performance values relating to the viewing zones, the viewing comfort and/or the cosmetic properties and the aesthetics of the individual spectacle lens may be provided for. Furthermore, performance values of alternative design proposals may be represented as well.

The area "Viewing" 162 of the graphical user interfaces 160A and 160B is therefore always divided into several sub-areas.

In the sub-area 174 "Binocular Viewing Zone Representation" of the area 162, the design ideal for the customer and the specified frame is schematically shown by means of an ellipsis. Gray areas are areas with aberrations (e.g. astigmatism in position of wear larger than 0.5 D). Moreover, the course of the 0.5-D isoastigmatism line may optionally be shown. The vertical heights of the distance and near reference points may each be characterized by (optionally differently colored) lines 175, 176. In the sub-area 177 of the area 162, numerical values for the spatial locations (in particular for the vertical height with respect to the centration point) of the distance and near reference points are shown.

In the sub-area 178 "Design Profile" of the area 162, a qualitative comparison of the sizes of the viewing zones with respect to each other is illustrated e.g. in the form of bars of different lengths, wherein F designates the distance zone, Z the intermediate zone, and N the near zone. The length of the respective bar or slide correlates with the respective setting of priorities associated to a corresponding distance zone. Since the length in the design profile results from the values of all previous masks, it may deviate from the preferences and weightings made by the customer before. Moreover, a qualitative assessment of the dynamic visual impression through the individual spectacle lens can be represented. The higher the bar representing the dynamic visual impression (bar "Dynamics"), the longer the progression zone length and the more the spectacle lens resembles a single-vision lens and the less rocking effect the spectacle lens has.

In addition, the optician and/or the spectacle wearer may be given the possibility to actively change the thus calculated spectacle lens. The change is e.g. made by actively altering the spatial location, in particular the vertical height of the distance and/or the near reference point. Alternatively, the weightings of the viewing zones can be changed.

Figure 17:
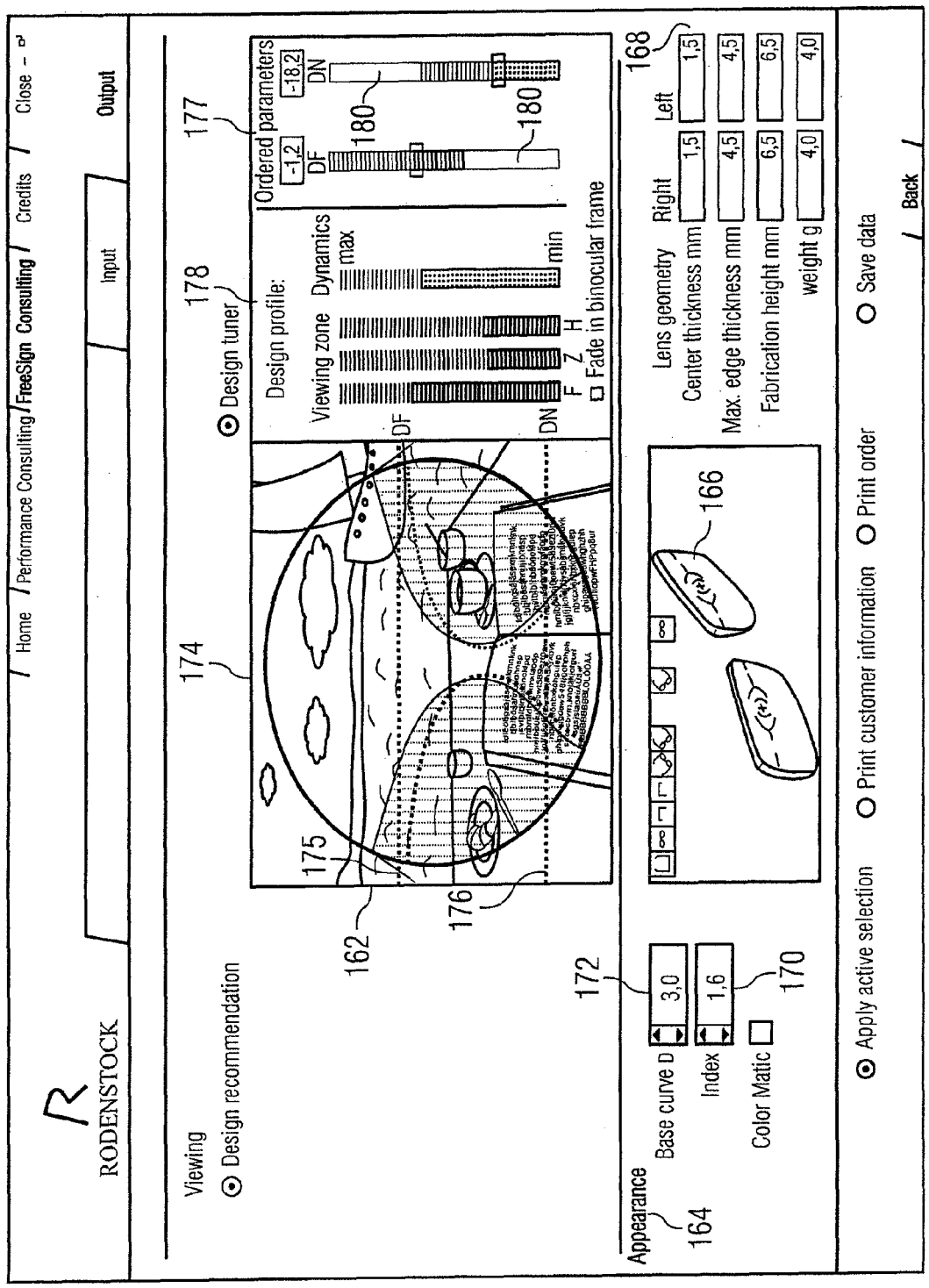

The change or adaptation of the position of the distance and/or the near reference point and/or the preferences with respect to the viewing zones can e.g. be done by means of a graphical user interface. An example of a suitable graphical user interface in the form of a slide control 180 is shown in FIG. 17. By means of the slide control 180 shown in FIG. 17, a direct adaptation of the position of the distance and/or the near reference point is possible.

The new spectacle lens design with the changed position of the distance and/or the near reference point is preferably calculated and visualized in real time. Preferably, the difference or change of the optical properties of the new spectacle lens design with respect to the old one is visualized as well.

In addition to the possibilities described in the design recommendation (FIG. 16), an ellipse may e.g. be faded in the design tuner, which in the box dimensions and the specified centration corresponds to the approximate, binocular customer frame. Furthermore, the proposed, individual design can be changed here by e.g. sliding slide controls for the distance and near reference points upward or downward. In the ordered parameters in the display fields for the distance and near reference points, the numerical values for the positions of the reference points change correspondingly. Moreover, the lines for the distance and near reference points shift in the binocular viewing zone representation as well.

In addition to the gray viewing zones of the design recommendation, preferably colored (e.g. yellow) viewing zone lines (e.g. 0.5-D isoastigmatismline) may appear, which illustrate the altered, individual design. Also, in the sub-area design profile 178, the relation of the sizes of the viewing zones with respect to each other and the length of the bar "Dynamics" change as well. The allocated points in the section "Design Profiler" are preferably not influenced by the changes in the section "Design Tuner".

The following examples show individual progressive design with distance and near reference points determined individually depending on the obtained individual data of the spectacle wearer.

Example 1

Spectacle Wearer Architect

The spectacle wearer attaches great importance to a wide intermediate zone and wishes to have a rather "quiet spectacle lens" with little rocking motion, since most of the day he uses the intermediate zone (medium distance) for job-related reasons. With his current spectacles he wears a progressive lens with a progression zone length of 18 mm.

For this spectacle wearer, for the selected frame and corresponding centration, the program suggests setting the distance reference point at +2.4 mm above the centration or fitting point. Optimally, the near reference point would be at −19 mm below the centration or fitting point. With this progressive spectacle lens, the architect has a good compromise of a relaxed head posture, a wide intermediate zone, and little rocking motion for his viewing habits.

Example 2

Spectacle Wearer Editor

She attaches great importance to a large near zone and wishes to have to lower her view less than with her current spectacle lens, since most of the day she spends working in the near zone for job-related reasons. With her current spectacles he wears a progressive lens with a progression zone length of 18 mm. For this spectacle wearer, for the selected frame and corresponding centration, the program suggests setting the distance reference point at 1.5 mm above the centration or fitting point. Optimally, the near reference point would be at −15.5 mm below the centration or fitting point. Thus, the editor has a good compromise of a wide near zone and a relaxed head posture.

If the spectacle wearer attaches great importance to wide intermediate and near zones and little rocking motion in the spectacle lens, the program suggest shifting the distance reference point upward depending on the other input parameters. The distance reference point would then be above the centration or fitting point. Depending on the refraction data and the individual parameters, a "blurring" in the centration or fitting point of up to +0.25 D can arise. In addition to this slight blurring in the centration point, lateral restrictions in the distance zone can occur as well, since the spectacle wearer—when the distance reference point is shifted upward—looks in the zero direction of sight due to the progression in the spectacle lens beginning earlier. Due to the changed position of the progression zone in the spectacle lens, the viewing zones may be accordingly smaller at the level of the centration point, since the peripheral aberrations are shifted "upward". However, when selecting the position of the distance reference point, the spectacle wearer obtains a spectacle lens design or spectacle lens designed and optimized according to their individual viewing habits.

Example 3

Spectacle Wearer Works in the Field

The spectacle wearer attaches particular importance to a large distance zone, since most of the day he uses the distance zone for job-related reasons. With his current spectacles he wears a progressive lens with a progression zone length of 18 mm. For this spectacle wearer, for the selected frame and corresponding centration, the program automatically calculates and suggests setting the distance reference point at −2.5 mm below the centration or fitting point. Optimally, the near reference point would be at −18.4 mm below the centration or fitting point. With this progressive spectacle lens, the spectacle wearer has a large distance zone and a good compromise of little rocking motion and well usable intermediate and near zones.

Example 4

Following the question as for which activities and vision needs the spectacle wearer uses their spectacles, the following profile results for example:
she drives a car regularly and watches TV;
she plays an instrument and attends an orchestra rehearsal 2 times per week;
in the evening, she likes reading the daily newspaper;
she does sports at least 1 time per week, e.g. jogging or playing handball in a club.

In her current spectacles, she wears progressive lenses with a normal progression zone length. Since no preferences can be seen and the activities of this customer are equally distributed to the zones distance, medium distance and near, the same number of points is allocated to all distances and also to the activity behavior or dynamics. In other words, all viewing zones and the dynamic behavior or the dynamic characteristics are weighted equally. In the specific example, 2 points are allocated for all zones of the "Design Profiler" shown in FIG. 12. In the graphical user interface "Design Recommendation", the calculation result is displayed considering the individual inputs into the previous masks. The program automatically calculates and suggests positioning the distance reference point at 0 mm and the near reference point at −18 mm for this customer. This spectacle lens would correspond to a balanced, universal progressive spectacle lens having a progression zone length of 18 mm (e.g. a spectacle lens "Impression ILT®" by the company Rodenstock GmbH), since when choosing the design, it is assumed that there is no emphasis on any activity in one of the distance zones.

Example 5

Following the question as for which activities and vision needs the spectacle wearer uses their spectacles, the following profile results:
he attaches particular importance to an undisturbed distance vision, since he spends most of the day in the car for job-related reasons;
he only needs medium distance vision in order to clearly see the dashboard;
near vision is only required for short writing activities, such as conclusions of contracts and the like;
in this leisure time, he likes playing tennis and squash; little rocking motion in the spectacle lens is of particular importance to him.

In his current spectacles, he wears progressive lenses with a normal progression zone length (PZL). The spectacle wearer's preference is clearly the distance vision; the medium distance and the near play a subordinate role. Therefore, in this example, 4 points were allocated to the distance, and 1 point for medium distance and near each (cf. FIG. 12). Due to the requirements of the dynamic sports, such as freedom of distortion and good spatial perception, the activity behavior or dynamics was weighted with 3 points in the "Design Profiler" shown in FIG. 12. In the graphical user interface "Design Recommendation", the calculation result is displayed considering the individual inputs into the previous masks. The program automatically calculates and suggests positioning the distance reference point at −1.1 mm and the near reference point at −18.5 mm for this customer. Due to the position of the near reference point and the related relatively long progression zone length, the spectacle lens resembles a single-vision lens and is almost distortion-free. This influences the sporting activities of the spectacle wearer in a positive manner.

Example 6

Following the question as for which activities and vision needs the spectacle wearer uses their spectacles, the following profile results:
  distance vision plays a subordinate role, since he usually takes the spectacles off when driving a car;
  medium distance vision is of particular importance to him;
  the spectacle wearer is very sensitive to unusual distortion, e.g. in the case of curved lines in his graphical sketches;
  after work, he likes reading detective stories;
  due to his stressful job, he has no time for sports or other activities.

Thus, the most important distance for this spectacle wearer is the medium distance, near vision is important as well, distance vision and activity behavior play a subordinate role. Therefore, in the "Design Profiler" shown in FIG. 12, 1 point is allocated to the distance vision and the activity behavior each, 3 points for the medium distance and 2 points for the near vision. In the graphical user interface "Design Recommendation", the calculation result is displayed considering the individual inputs into the previous masks. The program automatically calculates and suggests positioning the distance reference point at +0.7 mm and the near reference point at −18.5 mm for this customer. Thus, the largest possible intermediate zone is realized. Due to the position of the near reference point and the related relatively long progression zone length, the spectacle lens resembles a single-vision lens and is almost distortion-free. This is of benefit to the spectacle wearer during his work with graphical sketches.

Example 7

Following the question as for which activities and vision needs the spectacle wearer uses their spectacles, the following profile results:
  she hardly uses the spectacles for distance vision activities, it therefore plays a subordinate role;
  reading documents is particularly important in her job;
  she attaches great importance to a comfortable infraduction for near vision tasks;
  due to the rather static posture at the workplace, rocking motions play a subordinate role;
  medium distance vision is necessary for occasional computer work.

The most important distance for this spectacle wearer is the near distance. The medium distance is important as well, distance vision and the activity behavior play a subordinate role. Therefore, in the "Design Profiler" shown in FIG. 12, 4 points are allocated to the near vision, 2 points for the medium distance and 1 point for the distance vision and the active behavior each. In the graphical user interface "Design Recommendation", the calculation result is displayed considering the individual inputs into the previous masks. The program automatically calculates and suggests positioning the distance reference point at +0.8 mm and the near reference point at −17.0 mm for this customer. Thus, the largest possible intermediate and near zones are realized for the customer's needs. Due to the position of the near reference point, the spectacle wearer's wish for a comfortable infraduction for near vision tasks is put into practice in her individual progressive lens.

With a button "Apply Active Selection", it can be determined which data is to be applied for the order. For example, the data for the area presently active (not in the background) is always applied. After the button "Apply Active Selection" has been pressed, an order form filled with the result can be printed out. The order form may be completed e.g. with further details, such as color, coating, ColorMatic color, measuring frame, etc. The individual data can also be stored and/or sent online to a spectacle lens manufacturer.

The individual data of the spectacle wearer can also be obtained by means of suitable order forms and be forwarded to the spectacle lens manufacturer. FIG. 18 shows an exemplary order form. In the order form are indicated the obtained individual refraction data (sphere, cylinder, axis, prism, base), frame and centration data, individual parameters of the spectacle wearer's eyes and the individual position of wear (pupillary distance, face form angle, forward inclination, corneal vertex distance, etc.), and optionally further individual data. With the help of the order form, it is possible to select the positions of the distance and/or the near reference point such that these correspond to the positions of a universal progressive lens design (e.g. Impression® or Impression XS® by the company Rodenstock GmbH). It is also possible to specify a medium progression zone length of 16 mm. Alternatively, the positions of the distance and/or the near reference point may be specified depending on the individual frame data (frame-optimized design). In this way, for example, the distance reference point can be specified on the centration point (i.e. at 0 mm) and the near reference point at 2 mm above the lower frame edge. Furthermore, the positions of the distance and near reference points can be determined individually considering further individual data (e.g. emphasis on activities and preferences regarding the viewing zones), as has been explained in detail above.

Subsequently, an individual spectacle lens is calculated and optimized, wherein the optimization takes place considering at least part of the obtained individual data, in particular data regarding the individual parameters of the spectacle wearer and the individual position of wear (face form angle, forward inclination, pupillary distance, corneal vertex distance, etc.).

In order to describe and/or calculate the imaging properties of spectacle lenses in the situation of wear, two calculation methods are known in geometrical optics:
  calculation with light rays (ray tracing); and
  calculation with wave fronts (wave tracing).

The term "ray tracing" is comprised of ray (German: Strahl) and tracing (German: Verfolgung). In geometrical optics, the ray tracing method is used to describe optical imaging. However, the calculation of a spectacle lens by means of ray tracing is very time-consuming, since for each point in the spectacle lens except for the actual light ray or main ray an "accompanying" bundle of neighboring rays through the spectacle lens has to be simulated as well.

Preferably, the individual spectacle lens is calculated by means of a wavefront tracing method, in particular by means of a local wavefront optimization. The term "wave tracing" is comprised of wave (German: Welle) and tracing (German: Verfolgung). Wavefronts can be used like light rays to describe or calculate optical imaging. A wavefront is the surface of same phase of a propagating wave. Each such wavefront combines all properties of a bundle of neighboring rays in a single object. Thereby, the calculation time can be reduced considerably, so that an individual optimization of each single spectacle lens is enabled. In particular, due to the free selection of the design points distance and/or near, it is possible to tailor the distribution of the imaging properties on the spectacle lens to the individual viewing habits of the spectacle wearer.

Figure 19:
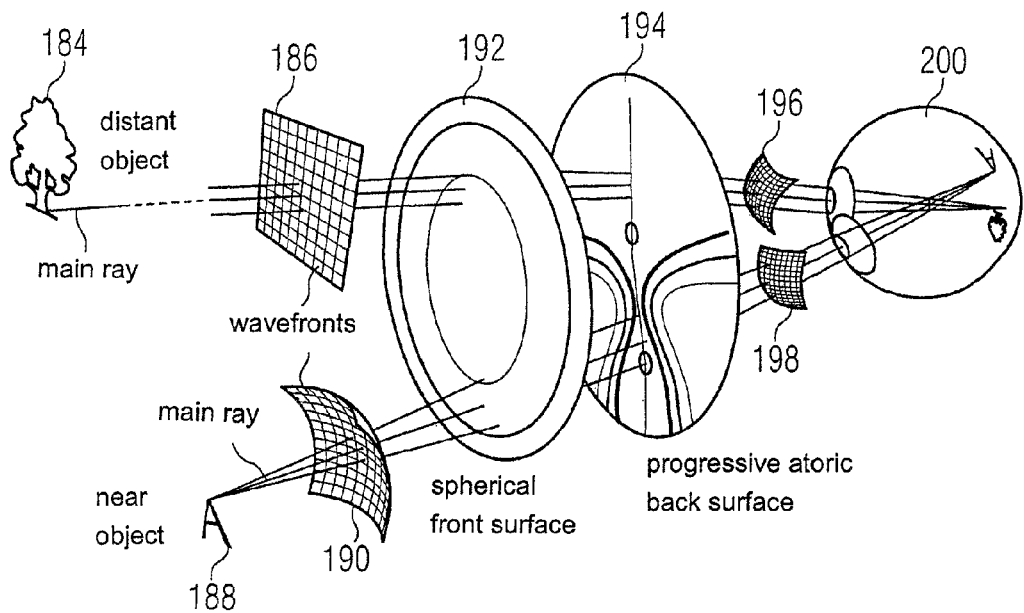

FIG. 19 shows a schematic illustration of the physiological and physical model of a spectacle lens in a specified position of wear, which it can be seen in FIG. 19 that the rays from an infinitely distant object 184 are all parallel, which is reflected in a plane wavefront 186. In contrast, the rays coming from a near object 188 diverge. The wavefront 190 is curved accordingly. The spectacle lens having a preferably spherical front surface 192 and an individually calculated, progressive atoric back surface 194 now has to make sure that each wavefront 196, 198 is curved on the eye side such that the corresponding object 184, 188 is sharply defined on the retina of the eye 200. In an ideal case, these wavefronts must be curved on the eye side to the same extent for all directions of sight.

For the calculation of the spectacle lens, use is preferably made of a flexible surface design of the progressive surface to be calculated individually, having a plurality of evaluation points (preferably more than 7000 evaluation points), wherein each of these evaluation points is assigned its own local wavefront tracing. Preferably, the individual progressive surface is optimized by minimizing a target function evaluated at the evaluation points and by taking the physiological vision model into account. In this manner, it is possible to perform the optimization of a spectacle lens according to the variable target function by means of individual wavefront tracings very quickly and thus online after receipt of order.

The calculation of the spectacle lens preferably comprises an optimization with more than 2000 optimization parameters in a highly dimensional space. Multiprocessor mainframe computers can be used for the thus performed real-time online optimization.

Preferably, in the individual optimization of the spectacle lens, not only aberrations of low order (sphere, cylinder, prism), but also aberrations of higher order (e.g. coma and spherical aberration) are minimized. In this respect, reference is made to U.S. Pat. No. 7,063,421 B1. The fabrication of the individually calculated spectacle lens takes place e.g. by means of precision machines, preferably CNC grinding and polishing machines capable of realizing the calculated surface data with a precision in the µm range.

Preferably, in the optimization of the individual spectacle lenses, Listing's rule is particularly taken into account.

Figure 20A:
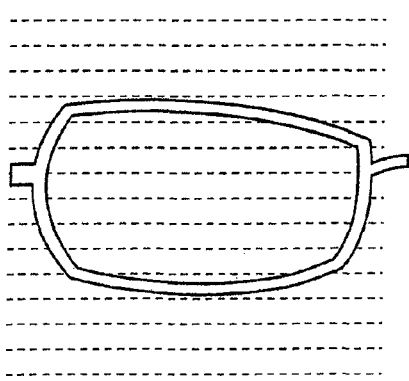
Figure 20B:
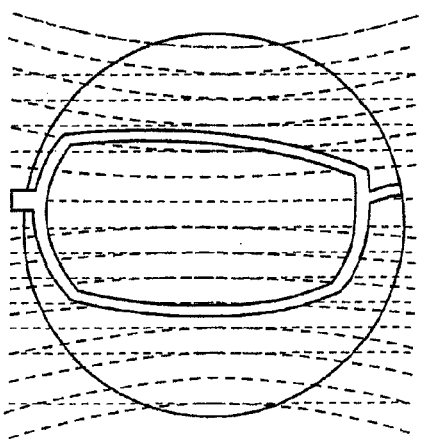

FIGS. 20a and 20b are schematic illustrations of the axis positions in a spectacle lens without taking Listing's rule into account (FIG. 20a) and with Listing's rule considered (FIG. 20b).

Since the eye performs a slight cycloduction during peripheral sight deviations, or eye excursions, there must not be a fixed cylinder axis throughout the entire spectacle lens, but it must change in the transition from the horizontal to the vertical (FIG. 20b). If the cylinder (known due to refraction) present in the eye is to be corrected well by the spectacle lens, the axis position of the cylinder in the spectacle lens must match well with the axis position the eye actually assumes because of its cycloduction. If the axis positions of the eye and the spectacle lens do not match, two obliquely crossed cylinders result. In the case of oblique, lateral sight deviations, the spectacle wearer would have an astigmatism that would not be corrected. This leads to a loss of vision in one zone. Preferably, the torsion adjustment is considered in the calculation of the individual spectacle lens. The consideration of Listing's rule becomes all the more relevant:

the higher the refraction cylinder of the customer is, and/or
the stronger the sight deviation deviates from the horizontal and vertical movement, and/or
the stronger or larger the sight deviation is in total.

In a conventional progressive spectacle lens with a progressive front surface and a spherical/toric prescription surface, Listing's rule cannot be applied—in contrast to spectacle lenses with a progressive, individual, eye-side freeform surface.

Further preferably, in the optimization and calculation of the individual progressive spectacle lens, an individual predecentration is taken into account. Thus, the usable diameters are enlarged. The optimum predecentration can be calculated automatically on the basis of data relating to the frame and spectacle lens shape and data relating to the centration. Alternatively, an individual predecentration can be set by the optician himself. In this case, the desired diameter determined by means of a special centration card can be taken into account as well. In particular, a predecentration of up to 5 mm can be considered.

The individually calculated spectacle lens preferably has a spherical or rotationally symmetrical, aspherical, object-side front surface and an individual, progressive, eye-side freeform surface optimized depending on individually determined reference or design points distance and near, the individual refraction data, the individual parameters of the spectacle wearer and the situation of wear (e.g. pupillary distance, forward inclination, face form angle, corneal vertex distance, etc.).

The positions of the individual distance and near reference points are preferably marked by means of an individual stamping by means of non-permanent markings. Preferably, the positions of the individual distance and near reference points can be uniquely reconstructed by means of permanent markings or micro-engravings of the spectacle lens and a reconstruction rule (template, centration card).

FIGS. 21a, b show examples of non-permanent stampings of two individual progressive spectacle lenses.

The non-permanent marking or stamping of an individual spectacle lens optimized according to a preferred method of the invention consists of "movable" and "fixed" parts. The movable parts include two round brackets 202 marking the position of the distance reference point or the design point distance, and the near measuring circle 204 which marks the position of the near reference point or the design point "near". The distance reference point is located in the middle of the round brackets 202 and the near reference point in the middle of the near measuring circle 204. Depending on the positions of the distance and near reference points, the stamping of an individual spectacle lens may look differently thus. The position of the centration or fitting point is marked by means of a cross 206 (centration cross).

In a normal case, the prism reference point 208 is located 4 mm below the centration point. If the anisometropia is higher and the customer has a certain wish regarding a specific weighting (e.g. if the prismatic vertical differences are to be matched in the near zone), a prism matching point can be shifted in the desired direction.

In the example shown in FIG. 21a, the distance reference point is located at the level of the centration point. The near reference point is located at a vertical level of −18 mm below the centration point. FIG. 21b shows a further example of an individual stamping or an individual stamping image of an individual spectacle lens. The spectacle lens is individually calculated and optimized for a spectacle wearer attaching great importance to a large distance zone. The distance reference point is located at a vertical level of −4 mm below the centration or fitting point and the near reference point is located at a vertical level of −18 mm below the centration or fitting point.

Preferably, the values for the positions of the distance and near reference points (in particular for the vertical level with respect to the centration or fitting point) are also permanently engraved in the spectacle lens.

In exceptional cases, the stamping may differ from the above-described one. Furthermore, an explicit, non-permanent marking of the positions of the distance and near reference points and/or the centration or fitting point may be omitted. However, the reference points can be uniquely determined by means of a reconstruction rule comprising a centration card, stamped scales in steps of 1 mm, and a lens packet. In order to reconstruct the reference points, the spectacle frame is put onto the centration cross of the centration card with the marked centration point and the positions of the distance and near reference points are drawn onto the spectacle lens. The positions of the distance and near reference points may also be determined with the help of the permanently engraved values below the nasal base curve and index engravings.

In addition to a reconstruction of the positions of the reference points, it is possible to determine an optimum diameter of the raw-round spectacle lens by means of a corresponding centration card.

The determination of an optimum diameter by means of a centration card can be performed as follows:

1) Determining the corresponding minimum diameter for the selected frame, which—irrespective of the lateral centration—corresponds to the smallest circumscribing diameter circle of the centration card. This value corresponds to the first value in a diameter order, e.g. 50/60.
2) Positioning the visual point determined in the fitting process on the centration card such that it coincides with the centration cross of the centration card.
3) Reading the largest required diameter. In a decentration in the nasal direction, which is mostly the case (pupillary distance PD smaller than the center distance of the frame), this is the diameter circle which temporally circumscribes the frame. This value corresponds to the second value of the diameter order, e.g. 50/60. Preferably, the difference between the usable diameter and the minimum diameter is not more than 10 mm.
4) If the diameters are nasally and temporally the same, a centric version of the order is recommended.

In addition to the non-permanent markings or stampings, the individual spectacle lens also has permanent (micro-) engravings.

FIG. 22 shows the permanent engraving of an individually optimized, left spectacle lens viewed from behind (i.e. from the eye side). The functional engraving or permanent marking for the alignment of the spectacle lens is the infinite sign. The two functional engravings 210, 212 are located at a mutual distance of 34 mm at the level of the centration point or centration cross. Below the nasal infinite sign 212, the base curve engraving 214 and the index engraving 216 are located, both having two digits. Therebelow is the engraving 218 for the positions of the distance and near reference points. The first number indicates the vertical distance of the distance reference point relative to the centration or fitting point. The second number indicates the vertical distance of the near reference point relative to the centration or fitting point.

The distance reference point may preferably be in a range between −4 and +4 mm below or above the centration point. The near reference point may preferably be in a range between −13 and −20 mm below the centration or fitting point.

The two-digit addition engraving 220 is located temporally below the functional engraving 210.

In summary, in FIG. 22 designates:

| | |
|---|---|
| ∞ | functional engraving; |
| 25 | addition; |
| 65 | base curve; |
| 60 | refractive index; |
| −4 | individual vertical distance of the distance reference point from the centration or fitting point; |
| 18 | individual vertical distance of the near reference point from the centration or fitting point. |

The finished and stamped spectacle lens is packed into a lens packet and supplied to the optician/customer. An example of a lens packet is shown in FIG. 23. FIG. 24 shows a list of the pictograms and symbols used on the lens packet.

The individual data of the spectacle wearer is printed on each lens packet. More specifically, the following data is printed on each lens packet:

lens type, material, color, coating, diameter
ordered values: sphere, cylinder, axis, prism (resulting), base (resulting), addition;
target measured values for the focimeter in the measuring point for distance and addition in a concave vertex measuring position incl. the measurable prism in the prism reference point (composed of DRP and ordered prisms);
with prismatic refraction data: information on the type of refraction: PD centration (PMZ) or equation case (FF) and size and direction of the necessary centration correction;
general order data, additional information and commission on the back of the lens packet;
information on the individual parameters: monocular PD, CVD, FI, FFA;
information on the design points: positions of distance and near reference points with respect to the centration or fitting point;
base curve, predecentration and inset of the lens; indication of the corrected PD for fitting (COR PD) if the lens shape and the centration data are known.

The lens packet particularly contains the relevant data for a correct fitting in the spectacle frame, in particular data relating to the frame and lens shapes.

In particular, in an order where the lens shape and the centration data are indicated (such as with sports eyewear), the corrected pupillary distance PD is calculated for fitting (COR PD). This is necessary in order to obtain the right customer PD in the spectacles already provided with lenses. Also in the case of spectacle lenses with correction prism, the COR PD is to be used for fitting instead of the customer PD if the shape has been indicated. The necessary centration correction for prisms with horizontal and vertical base positions has already been taken into account in the calculation of the spectacle lenses. Thus, the value for the centration correction on the lens packet is always zero.

In an order without shape indication, the COR PD cannot be calculated, since the parameters (frame and centration data) required for the calculation thereof are not transmitted. In progressive spectacle lens with correction prisms optimized individually according to a preferred optimization method, the centration correction for prisms with horizontal and vertical base positions is preferably taken into account already when the lenses are calculated. The value for the centration correction on the lens packet remains zero. In an order where no shape is indicated, this value relates to the PD.

Figure 25A:
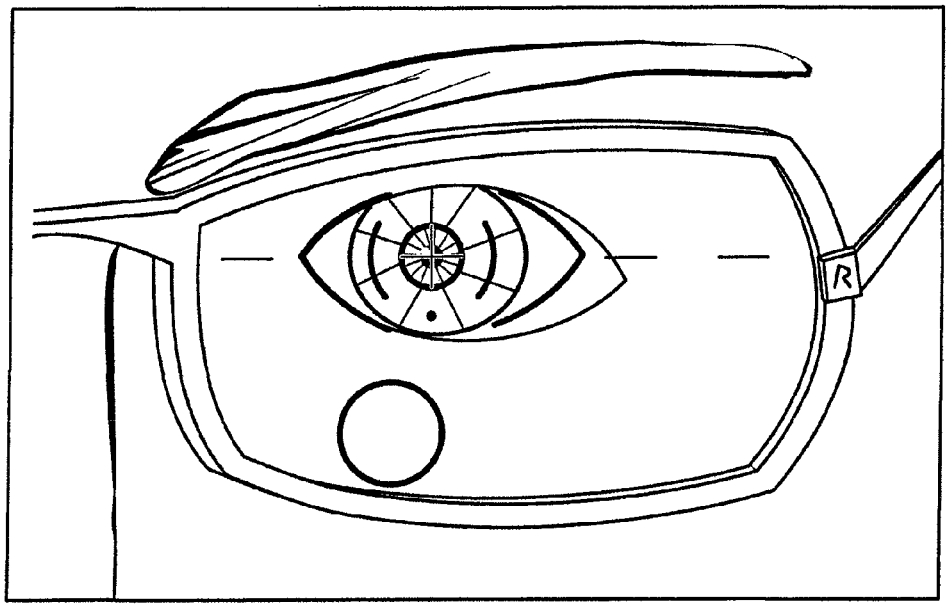
Figure 25:
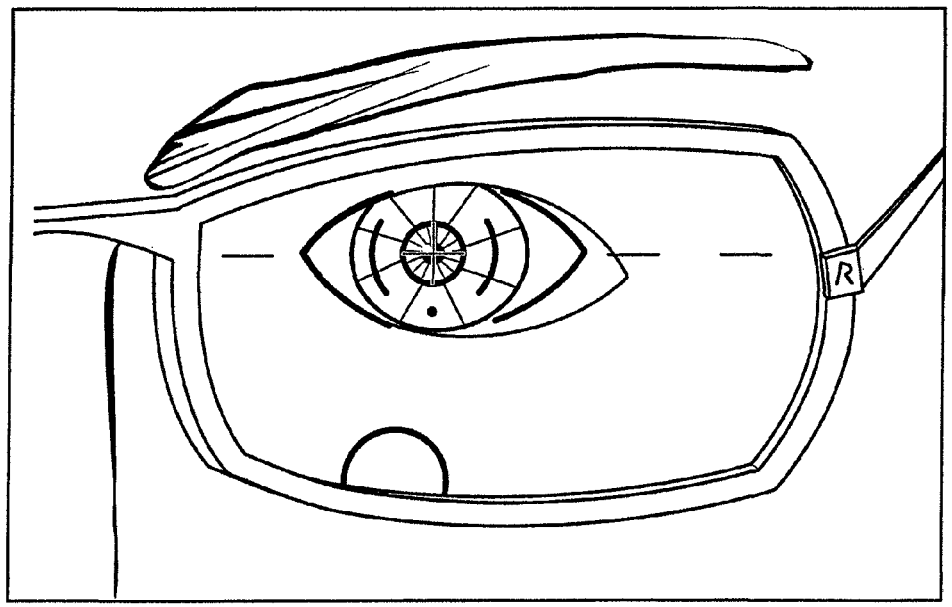

FIGS. 25a and 25b illustrate the centration of a progressive spectacle lens in front of the spectacle wearer's eyes and the corresponding position of the reference points. The spectacle lens shown in FIG. 25a is an individual spectacle lens with positions of the distance and near reference points individually determined according to a preferred method of the invention. In particular, the positions of the spectacle lens shown in FIG. 25a are specified individually depending on the frame data. The spectacle lens shown in FIG. 25b is a standard spectacle lens.

The individually calculated progressive spectacle lenses are adjusted according to reference point demands. This means, the centration or fitting point (or centration cross) is to be in the middle of the pupil in a habitual head and body posture in the zero direction of sight. The minimum fitting height depends on the position of the near reference point. Preferably, however, at least 2 mm remain below the near reference point in the frame. Thus, the minimum fitting height preferably is 15 mm below the centration point. If progressive lenses are adjusted differently from the centration recommendations, imaging properties may be restricted.

In the case of an erroneous centration of the spectacle lens, in particular if the centration is too low, this low centration leads to slight restrictions already in the distance zone. The differences particularly occur since the spectacle lens is not worn in the situation of wear underlying the optimization.

However, in contrast to the distance zone, considerable restrictions in a spectacle lens with lower centration can be found in the near zone. On the one hand, these restrictions result from the fact that the near zone is not present any more in the frame depending on the frame size and that the spectacle wearer looks through the progression zone in near vision, which progression zone is clearly narrower than the near zone. On the other hand, additional errors occur because the spectacle lens is not worn in the situation of wear underlying the optimization. Furthermore, with the same infraduction, the near power is not achieved and the customer has an additional accommodative effort.

An emphasis of the viewing zones can therefore correctly be created by shifting the distance and/or the near reference point, as has been described above. In addition, with a deviating principal direction of sight, e.g. in the case of particularly tall or small people, the principal viewing zones can be arranged individually such that they coincide with the respective principal direction of sight.

In the reference points, the so-called target measured values are measured as well, wherein the target measured values are indicated on the lens packet of the individual spectacle lens in addition to the ordered values. The target measured values preferably relate to the concave vertex measuring position. Tolerance considerations relate to the target measured values, not to the ordered values.

Distance Power

Figure 26A:
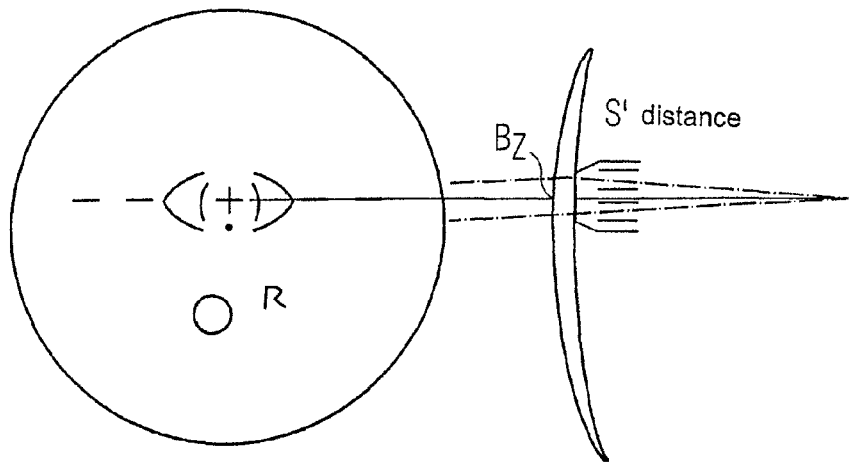

The target measured values for sphere, cylinder and axis are checked in the distance reference point. This distance reference point is located individually in a different manner, preferably within a range of +4 to −4 mm, about the centration point. The exact position of the distance reference point can be taken from the addition engraving below the base curve and index engravings. The measurement of the distance portion power is schematically illustrated in FIG. 26a.

Prismatic Power

Figure 26B:
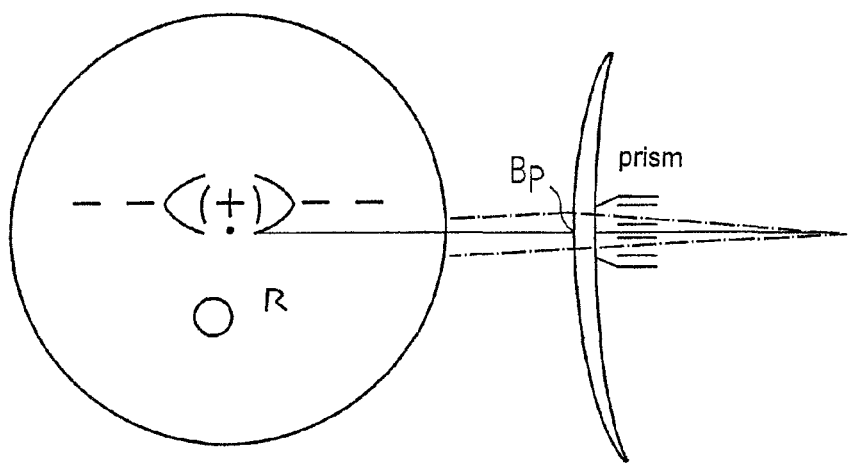

In the prism reference point, a combined power of thickness reduction prism (base position always 270°) and correction prisms is measured. The measurement of the prismatic power is schematically illustrated in FIG. 26b.

Near Power

Figure 26C:
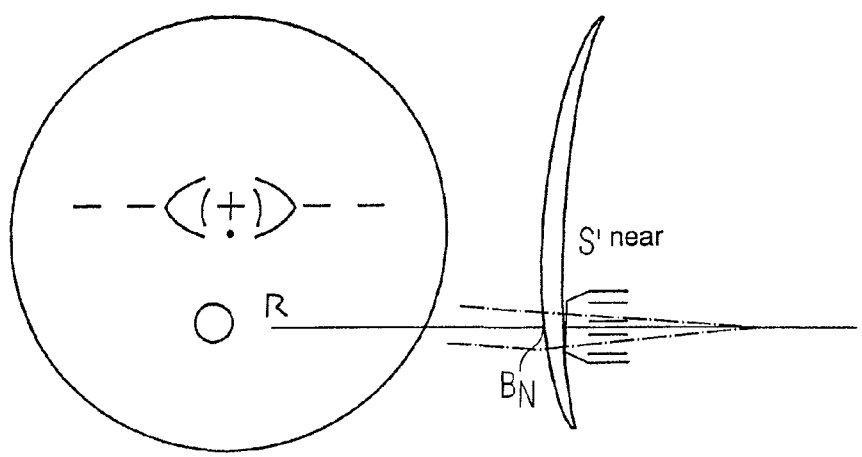

The near reference point is located individually in a different manner within a range of −13 to −20 mm below the centration point. The exact position of the near reference point can be taken from the addition engraving below the base curve and index engravings. The measurement of the near power is schematically illustrated in FIG. 26c.

Addition

The target measured value of the addition corresponds to the difference of the mean power (spherical equivalent) between the distance and near reference points. However, in many cases it is easier and generally sufficient to check the correspondence of ordered and engraved additions.

The flexible spectacle lens design according to the above-described method is particularly characterized by the following advantageous characteristics:

optimum correction of visual defects by taking all refraction data (power optimization), the frame and centration data as well as PD, CVD, FI and FFA into account;
viewing zones always have the optimum size and overlap ideally, since all individual parameters and refraction data are taken into account in the optimization;
optimization
  in position of wear;
  for all refraction data;
  wavefront optimization with consideration of aberrations of higher order, such as coma and spherical aberration;
  consideration of Listing's rule;
  with Freiformtechnologie (free form technology)
highest spontaneous compatibility;
pinpoint-precise inset, can also be ordered deviating from 100% convergence (e.g. for one-eyed people);
identical viewing zones on the right/left, also in the case of anisometropia;
ordering of the refraction data for distance vision also in steps of 0.12 D;
ordering of prisms/MDM incl.;
perfect aesthetics.

Preferably, the spectacle lens design determined and calculated individually according to the customer's needs and parameters exhibits characteristic features of a balanced universal spectacle lens design, i.e. maximally large viewing zones for all distances with at the same time harmonic transitions between the central and peripheral viewing zones. Such a design or such a spectacle lens thus offers optimum vision comfort for a wide range of everyday situations (driving a car, leisure time, reading, etc.).

The invention claimed is:

1. A computer-implemented method for calculating an individual spectacle lens design for a progressive spectacle lens having a variably adjustable, individual vertical position of a distance and a near reference point, comprising the following steps:

specifying a starting design exhibiting a predetermined vertical position of the distance and the near reference point;

calculating, by a processor-based computer, the individual spectacle lens design such that it exhibits the required, individual vertical position of the distance and the near reference point, wherein the calculation of the individual spectacle lens design comprises a calculation of a target value $S_{target}(y)$ for the spatial distribution of at least one optical property of the individual spectacle lens using a mapping $S_{target}(y) = S'_{target}(y')$ and a transform Y:

$y \mapsto y'$, $y \mapsto y'(y) = y - \Delta y(y)$ of a corresponding target value $S'_{target}(y')$ of the starting design, wherein $y'$ is the vertical coordinate of the target value of the starting design and $y$ is the vertical coordinate of the transformed target value of the individual spectacle lens design, wherein it holds true for the transform Y that:

$$\Delta y(y) = f(y) + y_0,$$

and where:
for $f'(y) > 0$, the transform causes a local stretching, and for $f'(y) < 0$, the transform causes a local compression of the starting design,
wherein the transform Y depends on the difference of the vertical position of the distance and the near reference point of the individual spectacle lens design and the difference of the vertical position of the distance and the near reference point of the starting design,
wherein it holds true for the transform coefficients a, b, c, d, m:

$$m = 1; \; d = -\frac{y_F + y_N}{2}$$

$$c = \frac{2\ln\left(\frac{\varepsilon}{2+\varepsilon}\right)}{l}$$

$$f_M = 1 + e^{-\frac{cl}{2}}; \; f_P = 1 + e^{\frac{cl}{2}}$$

$$a = \frac{l - l_D}{f_P^{-1} - f_M^{-1}}$$

$$b = \frac{f_M(l - l_D)}{f_P - f_M}$$

$$y_0 = y_F - y_{FD}$$

where:
$l_D = y_{FD} - y_{ND}$ is the progression length of the starting design;
$l = y_F - y_N$ is the progression length of the individual spectacle lens design;
$y_F$ is the vertical position of the distance reference point of the individual spectacle lens design;
$y_{FD}$ is the vertical position of the distance reference point of the starting design;
$y_N$ is the vertical position of the near reference point of the individual spectacle lens design;
$y_{ND}$ is the vertical position of the near reference point of the starting design; and
$1+\varepsilon$ is the factor that determines to what extent the distance a between the distance and the near portion asymptote of the function $f(y)$ exceeds the change of the progression length, and wherein the function $f(y)$ is a double-asymptote $$f(y) = b + \frac{a}{(1 + e^{c(y+d)})^m}$$

with transform coefficients a, b, c, m, d.

2. The method according to claim 1, wherein $|f'(y)|$ assumes higher values in a progression zone than in a near or distance zones.

3. The method according to claim 1, wherein the transform coefficients of the function $f(y)$ are determined starting from given starting values using an iterative method.

4. The method according to claim 1, wherein the transform coefficients of the function $f(y)$ are set depending on the difference $y_F - y_{FD}$ of the vertical position $y_F$ of the distance reference point of the individual spectacle lens design and the vertical position $y_{FD}$ of the distance reference point of the starting design; and
the difference $y_N - y_{ND}$ of the vertical position $y_N$ of the near reference point of the individual spectacle lens design and the position $y_{ND}$ of the near reference point of the starting design.

5. The method according to claim 1, wherein the transform coefficients a and b are determined numerically with a Newton iteration method such that when $y_0 = y_F - y_{FD}$, the following conditions are satisfied:

$$y_{FD} = y_F - \Delta y(y_F) \text{ and } y_{ND} = y_N - \Delta y(y_N),$$

where:
$y_F$ is the vertical position of the distance reference point of the individual spectacle lens design;
$y_{FD}$ is the vertical position of the distance reference point of the starting design;
$y_N$ is the vertical position of the near reference point of the individual spectacle lens design;
$y_{ND}$ is the vertical position of the near reference point of the starting design.

6. The method according to claim 1, wherein the at least one optical property of the spectacle lens is the astigmatism or the astigmatic deviation.

7. The method according to claim 1, wherein
the individual spectacle lens design further comprises an individual object distance function along the principal line of sight of the spectacle lens;
the starting design further comprises a start object distance function along the principal line of the spectacle lens; and
wherein the individual object distance function is obtained using a second transform $Y_2$ of the start object distance function.

8. The method according to claim 7, wherein the transform coefficients of the second transform $Y_2$ are determined with a Newton iteration such that the refractive power of the spectacle lens in the distance and the near reference point of the individual spectacle lens design matches the refractive power of the spectacle lens in the distance and the near reference point of the starting design.

9. The method according to claim 7, wherein a reciprocal object distance, $S_1(u_0, y)$ is described by a double-asymptote function:

$$S_1(u_0, y) = b_s + \frac{a_s}{(1 + e^{c_s(y - y_0 + d_s)})^{m_s}}$$

with coefficients $a_s$, $b_s$, $c_s$, $d_s$, $m_s$, where for predetermined coefficients $a_s$, $b_s$, $m_s$ the coefficients $c_s$, $d_s$ are determined with a Newton iteration.

10. The method according to claim 7, wherein the transform Y and the second transform $Y_2$ are the same.

11. The method according to claim 1, wherein the individual spectacle lens design comprises individual target values for the corresponding spatial distributions of a plurality of optical properties of the spectacle lens, and wherein all individual target values are calculated using the transform Y of the corresponding target values of the starting design.

12. The method according to claim 1, wherein the target value of the individual spectacle lens design are multiplied by a scaling factor $1/l_D$, where $l$ is the progression length of the individual spectacle lens design and $l_D$ is the progression length of the starting design.

13. The method according to claim 1, wherein the target value of the individual spectacle lens design are scaled by a function h=h(S'(y'),l_D/l), so that S(y)=S(y')·h(S'(y'),l_D/l), where $$S(y)=S_{target}(y);$$

$$S'(y')=S'_{target}(y');$$

l is the progression length of the individual spectacle lens design; and l_D is the progression length of the starting design.

14. The method according to claim 1, wherein the target value of the individual spectacle lens design are scaled by a function h=h(l_D/l), so that S(y)=S(y')·h(l_D/l), where $$S(y)=S_{target}(y);$$

$$S'(y')=s'_{target}(y');$$

l is the progression length of the individual spectacle lens design; and l_D is the progression length of the starting design.

15. The method according to claim 14, wherein h(l_D/l)=a·(l_D/l)+b.

16. A method for producing an individual progressive spectacle lens having a variably adjustable vertical position of a distance and a near reference point, comprising the following steps:
  calculating an individual spectacle lens design exhibiting the required vertical position of the distance and the near reference point, according to the method for calculating an individual spectacle lens design according to claim 1;
  calculating and optimizing the spectacle lens according to the individual spectacle lens design.

17. A method of using a spectacle lens, produced according to the producing method of claim 16, comprising arranging the spectacle lens in a predetermined average or individual position of wear of the spectacle lens in front of the eyes of a specific spectacle wearer, for correcting a visual defect of the spectacle wearer.

18. An apparatus for producing an individual progressive spectacle lens having a variably adjustable vertical position of a distance and a near reference point, comprising:
  means for calculating an individual spectacle lens design according to claim 1;
  means for performing a calculation and an optimization of the spectacle lens according to the individual spectacle lens design.

19. A non-transitory machine-readable computer program product which is adapted, when loaded and executed on a computer, to perform a method for calculating and optimizing a spectacle lens, wherein the method comprises the following steps:
  calculating an individual spectacle lens design exhibiting the required vertical position of a distance and a near reference point, according to the method for calculating an individual spectacle lens design according to claim 1;
  calculating or optimizing the spectacle lens according to the individual spectacle lens design.

20. A non-transitory machine-readable storage medium with a computer program stored thereon, wherein the computer program is adapted, when loaded and executed on a computer, to perform a method for calculating and optimizing a spectacle lens, wherein the method comprises the following steps:
  calculating an individual spectacle lens design exhibiting the required vertical position of a distance and a near reference point, according to the method for calculating an individual spectacle lens design according to claim 1;
  calculating or optimizing the spectacle lens according to the individual spectacle lens design.

21. A computer-implemented method for calculating an individual spectacle lens design for a progressive spectacle lens having a variably adjustable, individual vertical position of a distance and a near reference point, comprising the following steps:
  specifying a starting design exhibiting a predetermined vertical position of the distance and near reference point(s);
  calculating, by a processor-based computer, the individual spectacle lens design such that it exhibits the required, individual vertical position of the distance and the near reference point, wherein the calculation of the individual spectacle lens design comprises a calculation of an individual object distance function $S_1(y)$ along a principal line of the spectacle lens by means of mapping $S_1(y)=S_1'(y')$ and a transform Y:

$y \mapsto y'$, $y \mapsto y'(y)=y-\Delta y(y)$ of a corresponding object distance function $S_1'(y')$, wherein y' is the vertical coordinate along the principal line of the spectacle lens and y is the vertical coordinate along the principal line of the spectacle lens of the transformed object distance function of the individual spectacle lens design, wherein it holds true for the transform coefficients a, b, c, d, m:

$$m = 1; d = -\frac{y_F + y_N}{2}$$

$$c = \frac{2\ln\left(\frac{\varepsilon}{2+\varepsilon}\right)}{l}$$

$$f_M = 1 + e^{-\frac{cl}{2}}; f_P = 1 + e^{\frac{cl}{2}}$$

$$a = \frac{l - l_D}{f_P^{-1} - f_M^{-1}}$$

$$b = \frac{f_M(l - l_D)}{f_P - f_M}$$

$$y_0 = y_F - y_{FD}$$

where:

$l_D = y_{FD} - y_{ND}$ is the progression length of the starting design;

$l = y_F - y_N$ is the progression length of the individual spectacle lens design;

$y_F$ is the vertical position of the distance reference point of the individual spectacle lens design;

$y_{FD}$ is the vertical position of the distance reference point of the starting design;

$y_N$ is the vertical position of the near reference point of the individual spectacle lens design;

$y_{ND}$ is the vertical position of the near reference point of the starting design; and 1+ε is the factor that determines to what extent the distance a between the distance and the near portion asymptote of the function ƒ(y) exceeds the change of the progression length, and wherein the function ƒ(y) is a double-asymptote $$f(y) = b + \frac{a}{(1+e^{c(y+d)})^m}$$

with transform coefficients a, b, c, m, d.

22. The method according to claim 21, wherein the transform coefficients of the transform Y are determined with a two-dimensional Newton iteration, such that the refractive power of the spectacle lens in the distance and the near reference point of the individual spectacle lens design matches the refractive power of the spectacle lens in the distance and the near reference point of the starting design.

23. The method according to claim 21, wherein a reciprocal object distance, $S_1(u_0, y)$ is described by a double-asymptote function:

$$S_1(u_0, y) = b_s + \frac{a_s}{(1+e^{c_s(y-y_0+d_s)})^{m_s}}$$

with coefficients $a_s$, $b_s$, $c_s$, $d_s$, $m_s$, where for predetermined coefficients $a_s$, $b_s$, $m_s$ the coefficients $c_s$, $d_s$ are determined by a Newton iteration.

* * * * *